United States Patent
Shah et al.

(10) Patent No.: US 11,435,732 B2
(45) Date of Patent: Sep. 6, 2022

(54) COGNITIVE AND ADAPTIVE TELEMETRY

(71) Applicant: ACCENTURE GLOBAL SOLUTIONS LIMITED, Dublin (IE)

(72) Inventors: Ketan Shah, Mumbai (IN); Abhijit Ekre, Pune (IN); Chandan Kumar, Patna (IN); Tanmay Dalal, Ahmedabad (IN); Anupriya Munjal, Gurgaon (IN); Giffy Jerald Chris, Mumbai (IN); Sanjay Rawat, Thane (IN); Rajeev S. Kumar, Sheohar (IN); Lukish Rajesh Yadav, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1092 days.

(21) Appl. No.: 16/032,882

(22) Filed: Jul. 11, 2018

(65) Prior Publication Data
US 2019/0018399 A1   Jan. 17, 2019

(30) Foreign Application Priority Data

Jul. 12, 2017   (IN) .............................. 201711024556

(51) Int. Cl.
*G05B 23/02* (2006.01)
*G06N 3/08* (2006.01)
(Continued)

(52) U.S. Cl.
CPC ....... *G05B 23/024* (2013.01); *G05B 23/0205* (2013.01); *G05B 23/0254* (2013.01);
(Continued)

(58) Field of Classification Search
None
See application file for complete search history.

(56) References Cited

U.S. PATENT DOCUMENTS

| | | |
|---|---|---|
| 2017/0060574 A1 | 3/2017 | Malladi et al. |
| 2017/0213130 A1* | 7/2017 | Khatri .................. G06N 3/0445 |

OTHER PUBLICATIONS

Syafiie, S., F. Tadeo, and E. Martinez. "Softmax and ε-greedy policies applied to process control." IFAC Proceedings vols. 37.12 (Year: 2004).*

(Continued)

*Primary Examiner* — Carlos R Ortiz Rodriguez
(74) *Attorney, Agent, or Firm* — Mannava & Kang, P.C.

(57) ABSTRACT

A telemetry master (TM) system provides automatic monitoring and maintenance of equipment by automatically generating predictive actions of a certain confidence threshold to backend systems which maintain a full duplex communication channel with the TM system. Data entries including context information that are generated by applications corresponding to the backend systems during the functioning of the backend systems are collected, analyzed and actionable items such as alerts, alarms of particular messages cause the telemetry master system to generate a predictive action of a minimum confidence threshold using a pre-trained first data model. A second data model is employed to identify particular equipment from the backend systems that is to implement the action. Results from implementing the action are collected and again used to train the data models. Certain applications can include intelligent agents which enable automatic execution of the actions.

20 Claims, 20 Drawing Sheets

(51) Int. Cl.
    *H04W 4/38*          (2018.01)
    *G06N 20/00*         (2019.01)
    *G06N 3/04*          (2006.01)
    *G06F 40/279*       (2020.01)

(52) U.S. Cl.
    CPC ............ *G06N 3/0445* (2013.01); *G06N 3/08* (2013.01); *G06N 20/00* (2019.01); *H04W 4/38* (2018.02); *G05B 2219/23272* (2013.01); *G06F 40/279* (2020.01)

(56) References Cited

OTHER PUBLICATIONS

Tokic, Michel, and Günther Palm. "Value-difference based exploration: adaptive control between epsilon-greedy and softmax." Annual conference on artificial intelligence. Springer, Berlin, Heidelberg (Year: 2011).*

Rudin, Cynthia, et al. "Machine learning for the New York City power grid." IEEE transactions on pattern analysis and machine intelligence (Year: 2012).*

Saveski, Grigorij Ljubin. Accessing natural language processing engines and tasks. MS thesis. (Year: 2014).*

Liu, Shaowei, et al. "Learning socially embedded visual representation from scratch." Proceedings of the 23rd ACM International conference on Multimedia. (Year: 2015).*

Antoniou, Antreas, and Plamen Angelov. "A general purpose intelligent surveillance system for mobile devices using deep learning." 2016 International Joint Conference on Neural Networks (IJCNN). IEEE. (Year: 2016).*

* cited by examiner

US 11,435,732 B2

COGNITIVE AND ADAPTIVE TELEMETRY

PRIORITY

The present application claims priority under 35 U.S.C. 119(a)-(d) to the Indian Provisional Patent Application Serial No. 201711024556, having a filing date of Jul. 12, 2017, the disclosure of which is hereby incorporated by reference in its entirety.

BACKGROUND

The ubiquitous presence of computers in almost every home, office, factory or other entities has led to availability of enormous quantities of data covering almost every aspect of life. In addition to historical data, real-time data is continuously produced via various electronic items such as but not limited to equipment in factories, automobile or other vehicular hardware, consumer cell phones, and the like. Huge data centers having capacity to store and process enormous amounts of data are also established by both businesses and by governments. Computer programs are being developed to mine the large quantities of data to learn about human and machine behaviors. Techniques such as supervised, unsupervised learning and the like are employed to train artificial intelligence (AI) components such as neural networks, support vector machines (SVMs) and the like.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
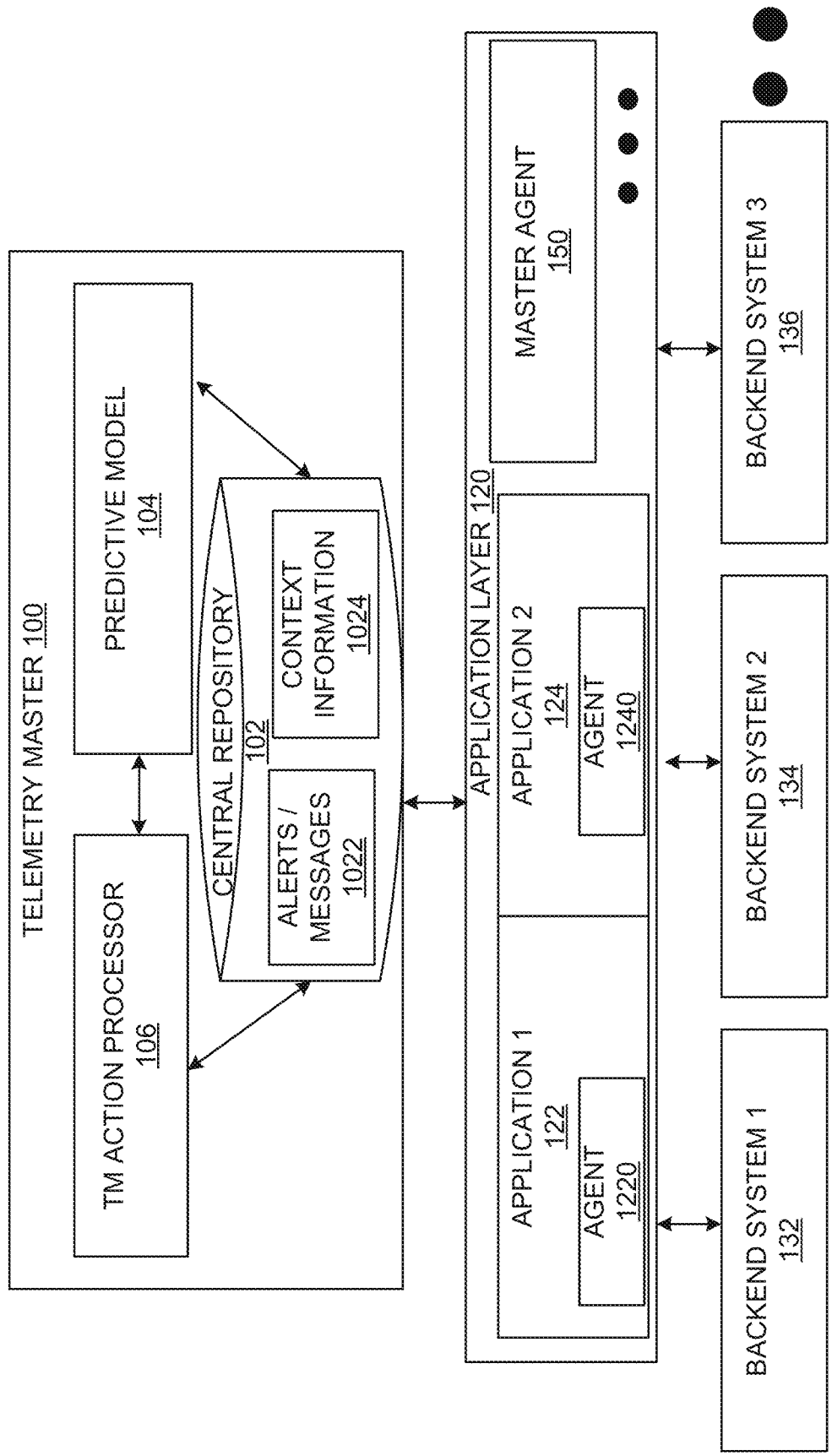
FIG. 1 shows a block diagram of a telemetry master (TM) system in accordance with one example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a telemetry master (TM) system maintains a central repository for a plurality of applications that correspond to a plurality of backend systems of various types which are associated with a single entity. The central repository includes a data buffer that receives data entries which include routine updates regarding working of the different backend system. The data entries received at the central repository can also include alerts, alarms or other system-generated or manual messages and data. In an example, the alerts may be from one or more of a plurality of backend systems of different types and may be associated with a single entity. The TM system processes the data entries and automatically initiates actions responsive to the alerts within one or more of the backend systems. The central repository included in the TM system receives and stores the various alerts along with extracting and maintaining context information associated with the alerts in a context buffer. Based at least on the attributes of the alerts and the context information, a predictive model predicts a next best action to be taken in response to the alert. A TM system Action processor receives the data regarding the action to be taken, and identifies one or more applications that are to be employed in executing the action.

The TM system has a corresponding application layer which includes a plurality of applications having application programming interfaces (APIs) that are configured with full duplex communication channel to regularly exchange the data entries with the TM system. The received data entries are transformed into a form that can be processed by the TM system and deposited into the central repository. In an example, an application respectively corresponding to a backend system may be included. The applications may further include agents to carry out various tasks under the control of the TM system. The TM system and the application layer form a reusable platform that can be extended to establishments in various fields which implement complex computing systems that ingest and emit data of different types and which require human input for executing tasks to control the computing systems.

When data entries from the plurality of applications are received at the data buffer, duplicate entries if any which are similar to the received data entries are deleted from the data buffer. As the plurality of applications exchange data via many processes the received data entries can also relate to various processes. In an example, the processes associated with the received data entries can be identified via process id tags associated therewith. The received data entries can be accessed by a logic buffer also included with the TM system. The logic buffer stores information related to the stream of data which is being currently processed to be used for next best action. One or more of attributes and context information is extracted from the data entry via natural language processing (NLP) techniques. In an example, the context information can be stored in the context buffer.

The attributes and the context information are provided to a pre-trained first data model for producing an action that can be executed by at least one of the plurality of backend systems. The pre-trained ML-based first data model can receive one or more of supervised or unsupervised training on historical data for identifying the action to be executed. The historical data can include manual entries made by earlier users regarding various updates, alerts, alarms or other issues, the various actions that were executed in response to the updates, alerts, alarms or other issues and the results of implementing the various actions in at least one of the plurality of backend systems.

Feature sets corresponding to the data entries can be set up by the TM system. A minimum number of data entries, corresponding to each of the different processes for example, may need to be received at the data buffer prior to setting up the feature sets. The feature sets used to build a feature matrix and based on further processing of the feature matrix, the action to be executed is determined. In an example, a level of confidence can be obtained from the feature matrix by employing techniques such as but not limited to a softmax function. The confidence level thus obtained can be compared to a predetermined confidence threshold. The action can be caused to be executed based on whether the confidence level can clear the confidence threshold. If the action does not meet the confidence threshold, the received data entries will continue to be processed by the first data model as detailed herein until an action that clears the confidence threshold is identified and implemented.

The attributes and the context information of the data items can be further provided to a second ML-based data model for identifying equipment that will execute the action. In an example, the first data model can be a deep learning neural network. In an example, the second data model can be a long short-term memory (LSTM). The identified equipment is caused to execute the action and results from the execution of the action are recorded in the data buffer of the context repository. In an example, the results from the execution of the action can be determined based on analysis of the data entries that are constantly recorded by the TM system in the central repository. The data entries can be analyzed using NLP techniques as detailed herein for determining if the action achieved a purpose. If yes, then the data entries associated with the executed action can be loaded into a learnt buffer and provided to the first data model for training thereby improving the accuracy of the first data model.

An example is disclosed wherein the TM system and the application layer are implemented in a power generating unit within a power utility establishment. Various tasks, such as but not limited to tracking health of assets, running a power plant, monitoring the amount of power produced, determining the sufficiency of the power produced, and advising further actions if insufficient power is produced, can be executed by the TM system in conjunction with various applications in the application layer. In an example, the applications for the utility establishment may include but are not limited to applications for interfacing with control systems, monitoring the functioning of the power plant, applications for determining the sufficiency of the generated power, applications for addressing a power deficit if insufficient power is generated, and applications to interface with the customers of the power plant.

Each of these applications may interface with the backend systems processing data of different data types to receive alerts or messages from the backend systems. The applications employ APIs from various technologies such as but not limited to machine learning (ML), artificial intelligence (AI), natural language processing (NLP), image processing, data science and the like to process data from the backend systems which may include a variety of data sources such as but not limited to SCADA devices, smart sensors, ERP, SCM or CRM application packages and the like. The APIs help implement solutions using blockchain, distributed ledger, smart contract, automation, cryptocurrency and the like.

Each of the applications interfacing with the backend systems may produce a user interface that enables the human personnel of the power plants to monitor the functioning of the power plant also in addition to monitoring the tasks executed by the TM system and the application layer. When and where required, the application layer provides for human intervention via various user-selectable controls. The implementation described herein enables advantages such as, but not limited to, an always "ON" utility, always "ON" workforce, automated trader to buy power at the least cost, reduced outages due to power deficits, maximizing the usage of AI and automation systems which optimize data usage by gleaning trends and implementing solutions based on the trends and reducing bad debts and late payments among the customers of the power utility establishment. The TM-application layer implementation enables applications such as cognitive virtual power plant and energy efficient advisor to optimize generation of power based on dynamically altering demand-supply equilibrium. Applications such as drone monitoring and image analysis improve efficiency in monitoring and other automated operations while power trader application enables the power utility establishment to buy optimal amount of power at the least cost. The increase in overall efficiency in turn translates to reduced cost to customers and reduced customer churn.

A master agent can be included in the application layer for monitoring and maintaining a network of various intelligent agents of different member types which may include, for example, bots and human users. The network may be a private network as implemented in the TM-application layer systems. However, in some examples, the network may be a public network wherein the master agent functions as a utility for administering the various aspects of the public network. The master agent includes APIs that enable the agents including one or more of the bots and humans (via their client devices) to register on the network and subscribe to receive events, updates or other data that is exchanged between members of the network. Different APIs may be adopted to enable membership of different member types.

For example, human users can sign up to the network or execute other actions on the network via user interfaces (UIs) while the agents may execute the actions programmatically. An integration platform such as Dell boomi enables configuring the APIs to build the network and the master agent.

The master agent not only enables subscription services between members but also enables members to establish proxies to handle communications when a particular member is off the network due to malfunction, network outage or other reason. The proxy service provides for a failover mechanism thereby ensuring continuity of services by the agents which may be servicing other network members. The master agent also provides ratings for members which enable other members to determine whether or not to sign up to receive a member's events. The network facilitates communications between agent members which may include many-to-one or even one-to-one communication. For example, an agent may select another agent with specific criteria such as but not limited to, the shortest time to response, geographically nearest agent or agent with a minimum rating and the like to receive a communication.

FIG. 1 shows a block diagram of the TM system 100 in accordance with one example. The TM system 100 provides for a centralized intelligent monitoring and action agent in a large entity such as industrial or commercial set up that includes a plurality of backend systems 132, 134, 136 and the like. The various backend systems 132, 134 and 136, may each have its own database and application layer, user interfaces and the like which may enable the backend system independent control of a subset of functions needed for running the establishment. Examples of backend systems for a commercial set up such as a power plant may include but are not limited to, power plant control systems, asset and safety monitoring systems, energy usage monitoring systems, energy trading systems, human resource systems, customer care systems and financial systems. Each backend system may be built using a specific technology, have its own APIs to output or to receive data input. Moreover the backend systems 132, 134 and 136 may emit data of various types and in various formats such as but not limited to geographical data such as GPS data, graph/map data, geospatial data, events/alerts, unstructured data, relational data and the like. Hence, in the absence of a centralized monitoring and action agent such as the TM system 100, valuable correlations that can be obtained by analyzing cross-functional data from different backend systems are lost.

The development of various technologies such as artificial intelligence (AI), data science, machine learning, natural language processing, image analysis techniques when combined with database technology that helps store large amounts of data emitted by each of the backend systems 132, 134, 136 . . . enables gaining valuable insights into the workings of the power utility establishment besides developing intelligence to increase the efficiency of the backend systems 132, 134 and 136. However, as each backend system 132, 134 or 136 has its own APIs and data formats for communication, bridging elements are required so that data of different formats emitted from different systems may be correlated. Accordingly, the TM system 100 is coupled to an application layer 120 which includes a plurality of applications such as application 1 122, application 2 124 and the like which can interface with the backend systems 132, 134, 136. In an example, a respective application from the application layer 120 may be interfacing with each of the backend systems 132, 134, 136. The applications 122, 124 etc. from the application layer 120 may receive the data from one or more of the backend systems 132, 134, 136 and the like, convert the data to a common format and store it to the central repository 102 included in the TM system 100.

The central repository 102 can be a database that receives the various messages, alarms or alerts 1022 from each of the applications 122, 124 . . . from the application layer 120. Each of the applications 122, 124 are configured with APIs to receive data from the backend systems 132, 134, 136 in their respective native formats and convert the received data to a uniform format that can be processed by the elements of the TM system 100. In an example, the TM system 100 includes a predictive model 104 which predicts an action to be executed in response to receiving an alert. In an example, the predictive model 104 can include neural networks that are put through supervised training on past data of alarms and actions that were taken in response to the alarms, conditions associated with the alerts, customer profiling data, customer-specific actions and the like. In an example, unsupervised learning techniques or tensor flow algorithm may be also be employed to train the predictive model 104. The predictive model 104 additionally considers the context information 1024 that may also be stored in the central repository 102. The context information 1024 can include information that tracks the messages or alerts received along with their attributes or metadata such as the application sending the alert, the date/time of the alert, the backend system causing the alert, properties of the backend systems 132, 134 etc. and the like. The context information 1024 can also include the actions initiated in response to the alerts, the applications and backend systems involved in executing the actions, the response or results obtained from the execution of the actions and any further action that was taken or that is to be taken subsequent the response/results from the actions.

The information regarding the action identified by the predictive model 104 is communicated to the TM Action processor 106. The action processor 106 can implement a second ML-based data model such as a LSTM. Based on the action to be executed, the TM Action processor 106 can identify the application (and hence, the backend systems 132, 134 . . . ) among the plurality of applications 122, 124 . . . which is to be selected for executing the action. In an example, the action can include a series of steps that are actually carried out by different applications. The TM Action processor 106 may identify such steps and the applications to execute the actions. Accordingly, the triggers to initiate the actions are transmitted to the corresponding applications. In an example, the applications 122, 124, . . . may include one or more individual agents 1220, 1240 . . . that execute scripts to carry out various functions such as raising alerts, exchanging messages, providing status updates and the like. In an example, the application layer 120 may include a master agent 150 to manage subscriptions between the agents as will be detailed further herein.

When one or more of the applications 122, 124 . . . receive triggers to initiate the actions, the various APIs to execute the actions are called. Further, the APIs to transmit the required data to the appropriate backend system(s) 132, 134, 136 are also called. The appropriate backend system(s) execute the actions and again return the results of the actions to the corresponding applications that triggered the actions. The applications in turn report the results of the actions to the TM system 100. Based on the alerts/messages 1022 and the context information 1024 in the central repository 102, the predictive model 104 can determine if the actions were adequate in resolving a situation that caused the actions. If yes, the TM system 100 may transmit or store data regarding the resolution of the action. If the situation is not resolved, then further action to resolve the situation may be identified by the predictive model 104 which can set into motion the procedure described herein for the execution of the further action.

Figure 2:
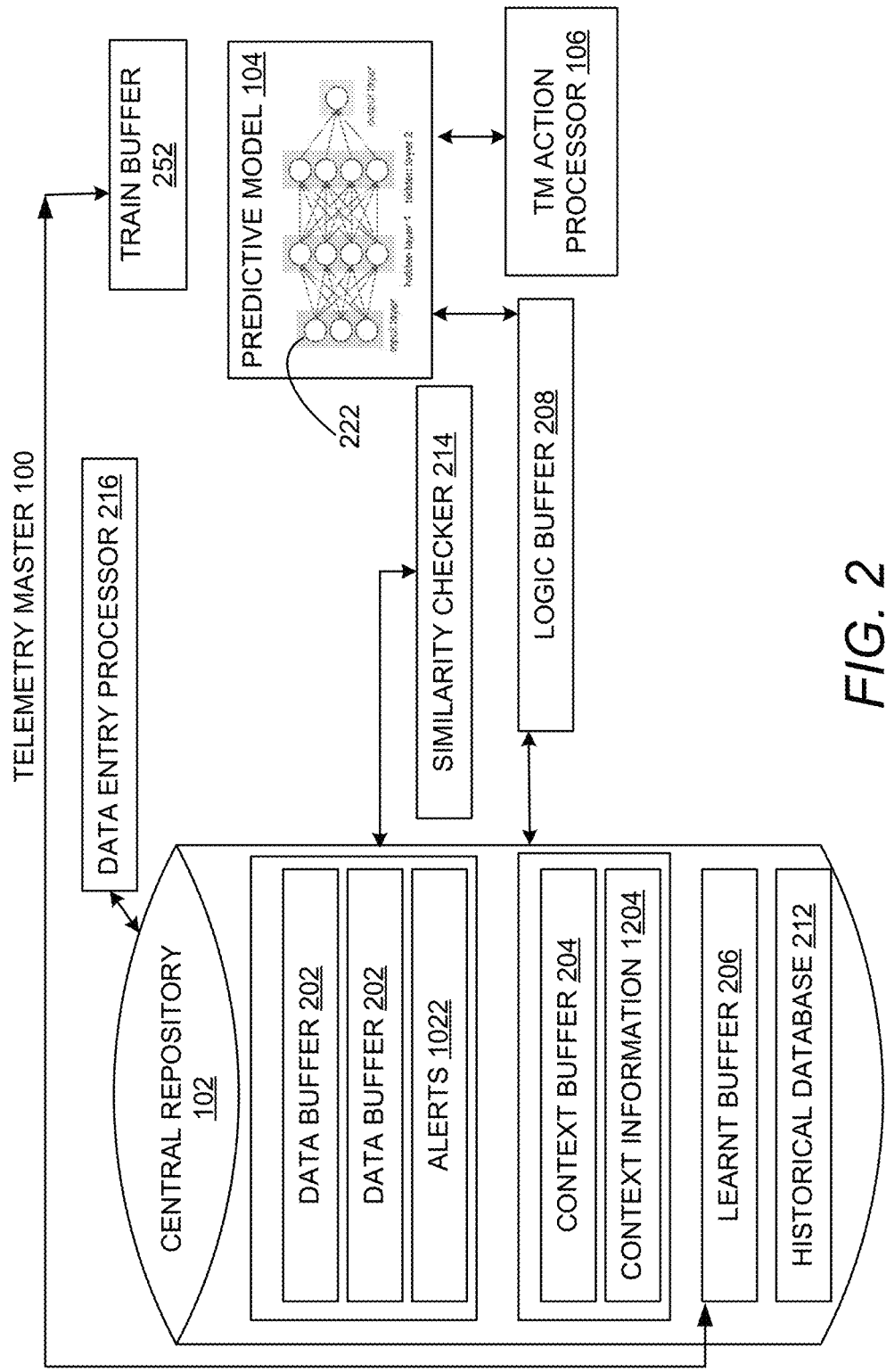
FIG. 2 illustrates a block diagram that shows the details of the TM system in accordance with some examples.

FIG. 2 illustrates a block diagram that shows the details of the TM SYSTEM 100 in accordance with some examples. As mentioned herein, the TM system 100 includes the central repository 102, the predictive model 104 and the TM action processor 106. The central repository includes a data buffer 202, a context buffer 204 and a learnt buffer 206. The central repository 102 can also include a historical database 212 which stores archived data related to the functioning of the plurality of backend systems 132, 134 . . . prior to the being connected to the TM system 100. For example, the archived data includes the various data entries emitted by the plurality of backend systems 132, 134 . . . including updates, alerts, messages, alarms etc. in addition to including information regarding the actions that were recommended either automatically by the backend systems 132, 134 . . . or manually by the workers, the recommended actions that were implemented, the results of the implemented actions and the like.

The data buffer 202 can be a temporary memory for holding the data entries received by the TM SYSTEM 100 which are being processed in accordance with examples disclosed herein. When a data entry is initially received at the data buffer, a similarity checker 214 can implement similarity checks based on techniques using similarity functions such as a cosine similarity for identifying if similar data entry exists in the data buffer 202. If yes, then the earlier recorded data entry can be deleted from the data buffer 202 while the later received data entry is stored. In an example, both the data entries can be recorded in the historical database 212.

For example, the data entries can have more than three features which can be represented graphically in a vector space which is a collection of objects which include vectors. The vectors can be added together and/or multiplied or scaled by numbers i.e., scalars. From the definition of a dot product:

$$v \cdot w = \|v\| \cdot \|w\| \cdot \cos \theta$$

which can be re-arranged as:

$$\cos \theta = v \cdot w / \|v\| \cdot \|w\|$$

As the number of features will generally be greater, cosine similarity which is a pure vector based similarity calculation can be used in the vector space. The TM system 100 includes a data entry processer 216 which can identify data patterns within the received data entries. As mentioned herein the data entries from various backend systems 131, 134, . . . which may be in nonhomogeneous data format can be converted into a common data format by a data entry processer 216. Based on the data patterns within the processed data entries the context buffer 204 can implement regular expressions to extract context information associated with each data entry.

When sufficient volume of a data pattern is formed, the TM SYSTEM 100 proceeds to predict an action to be executed. The logic buffer 208 accesses a data entry from the data buffer 202 to predict the action to execute. A pre-trained first data model or the predictive model 104 can be employed to predict the action to execute.

In an example, the predictive model 104 can include a deep learning neural network 222. Below is an example methodology of predicting an action by the predictive model 104.

Let a training set include four data entries from three different classes (0, 1, and 2) which correspond to different actions that can be executed.

$x_0 \rightarrow$ class 0
$x_1 \rightarrow$ class 1
$x_2 \rightarrow$ class 2
$x_3 \rightarrow$ class 2

The class labels can be encoded into a format eg. one-hot encoding.

$$\begin{bmatrix} [1. & 0. & 0.] \\ [0. & 1. & 0.] \\ [0. & 0. & 1.] \\ [0. & 0. & 1.] \end{bmatrix}$$

A sample that belongs to class 0 can have the first row has one in the first cell, a sample that belongs to class 2 can have a 1 in the third cell of its row, and so forth. Next, a feature matrix of the four training samples can be defined. Assuming, for example that the data set has two features a 4×(2+1) dimensional matrix can be created (+1 for the bias term). Similarly, a (2+1)×3 dimensional weight matrix can be created with one row per feature and one column for each class. In this case as the data set involves two features (Activity_ID, Cluster), input can be scaled from −3 to 3 so that all the features carry equal weightage. Accordingly:

$$\text{Inputs } X: \begin{bmatrix} [0.1 & 0.5] \\ [1.1 & 2.3] \\ [-1.1 & -2.3] \\ [-1.5 & -2.5] \end{bmatrix}$$

$$\text{Weights } W: \begin{bmatrix} [0.1 & 0.2 & 0.3] \\ [0.1 & 0.2 & 0.3] \end{bmatrix}$$

bias: $[\,0.01 \quad 0.1 \quad 0.1\,]$ $$X \text{ with } ''ones'': \begin{bmatrix} [1. & 0.1 & 0.5] \\ [1. & 1.1 & 2.3] \\ [1. & -1.1 & -2.3] \\ [1. & -1.5 & -2.5] \end{bmatrix}$$

$$W \text{ with bias}: \begin{bmatrix} [0.01 & 0.1 & 0.1] \\ [0.1 & 0.2 & 0.3] \\ [0.1 & 0.2 & 0.3] \end{bmatrix}$$

To compute the net input the 4×(2+1) feature matrix X is multiplied with the (2+1)×3 weight matrix W (n_features× n_classes).

Z=XW, which yields a 4×3 output matrix (n_samples× n_classes).

$$\text{net input}: \begin{bmatrix} [0.07 & 0.22 & 0.28] \\ [0.35 & 0.78 & 1.12] \\ [-0.33 & -0.58 & -0.92] \\ [-0.39 & -0.7 & -1.1] \end{bmatrix}$$

At this point, softmax function can be used to compute the probability y that a training sample x^(i)$ belongs to class j given the weight and net input z^(i). So, a probability p(y=j|x^(i); w_j) for each class label in j=1, . . . , k can be computed. Note the normalization term in the denominator which causes these class probabilities to sum up to one. Accordingly the next best action from the possible actions can be classified.

$$P(y = j \mid z^{(i)}) = \phi_{softmax}(z^{(i)}) = \frac{e^{z^{(i)}}}{\sum_{j=0}^{k} e^{z_k^{(i)}}}.$$

where net input z is defined as:

$$z = w_0 x_0 + w_1 x_1 + \ldots + w_m x_m = \sum_{i=0}^{M} w_i x_i = w^T x.$$

$$\text{softmax} \begin{bmatrix} [0.29450637 & 0.34216758 & 0.36332605] \\ [0.21290077 & 0.32728332 & 0.45981591] \\ [0.42860913 & 0.33380113 & 0.23758974] \\ [0.44941979 & 0.32962558 & 0.22095463] \end{bmatrix}$$

The values of each sample row as seen from above matrix, the values for each sample (row) sum upto one. For example in the first sample, '[0.29450637 0.34216758 0.36332605]' has a 29.45% probability to belong to class 0. Now, in order to turn these probabilities back into class labels, the argmax-index position of each row can be selected.

predicted class labels: [2200]

Predicted class labels are the action to be executed.

Now that the action to execute is determined, the TM action processor 106 is next used to identify the equipment from one or more of the backend systems 132, 134 . . . which is to execute the action. In an example, the TM action processor 106 implements NLP for analysis of the data entry to determine the equipment that will execute the action.

For example, a data entry 'Get Cluster Data from Solar Park Monitoring' can be analyzed via regular expressions (Regex) implemented by the context buffer 204. Accordingly, context information related to a target system 'Solar Park Monitoring' is extracted from the data entry. In this case LSTM sequence is implemented by the TM action processor 106 for the analysis. Similarly, another data entry 'Cluster 1 Area XYZ Tower 8 is affected' can be analyzed using regular expressions for extracting the context information 'Cluster 1 Area XYZ Tower 8'. Again Regex with LSTM can be implemented to identify that a cluster with context info '1', area 'XYZ' and tower '8' can be the equipment where the action is to be implemented.

The TM action processor 106 implements a line by line sequence for the LSTM as this approach will allow the second data model (LSTM) or the TM action processor 106 to use the context of each line in those cases where a simple one-word-in-and-out ambiguity. In this case this comes at the cost of predicting words across lines which can be used if only modeling and generating lines of text is required. Note that in this representation, a padding of sequences is required to ensure that the sequences meet a fixed length input, which is a requirement when using Keras.

First, the sequences of integers can be created, line by line using the Tokenizer already fit on the source text.

```
# create line-based sequences
sequences = list( )
for line in data.split('\n'):
    encoded = tokenizer.texts_to_sequences([line])[0]
    for i in range(1, len(encoded)):
        sequence = encoded[:i+1]
        sequences.append(sequence)
print('Total Sequences: %d' % len(sequences))
```

Next, the prepared sequences are padded using the pad_sequence( ) function provided in Keras. This first involves finding the longest sequence, then using that as the length by which to pad-out all other sequences.

```
# pad input sequences
max_length = max([len(seq) for seq in sequences])
sequences = pad_sequences(sequences, maxlen=max_length, padding='pre')
print('Max Sequence Length: %d' % max_length)
```

Next, the sequences are split into input and output elements as done earlier.

```
# split into input and output elements
sequences = array(sequences)
X, y = sequences[:,:-1],sequences[:,-1]
y = to_categorical(y, num_classes=vocab_size)
```

Once above steps are executed, the second data model corresponding to the TM action processor 106 is defined and trained to give the equipment that is to execute the particular action that was determined by the deep learning neural network.

Figure 3:
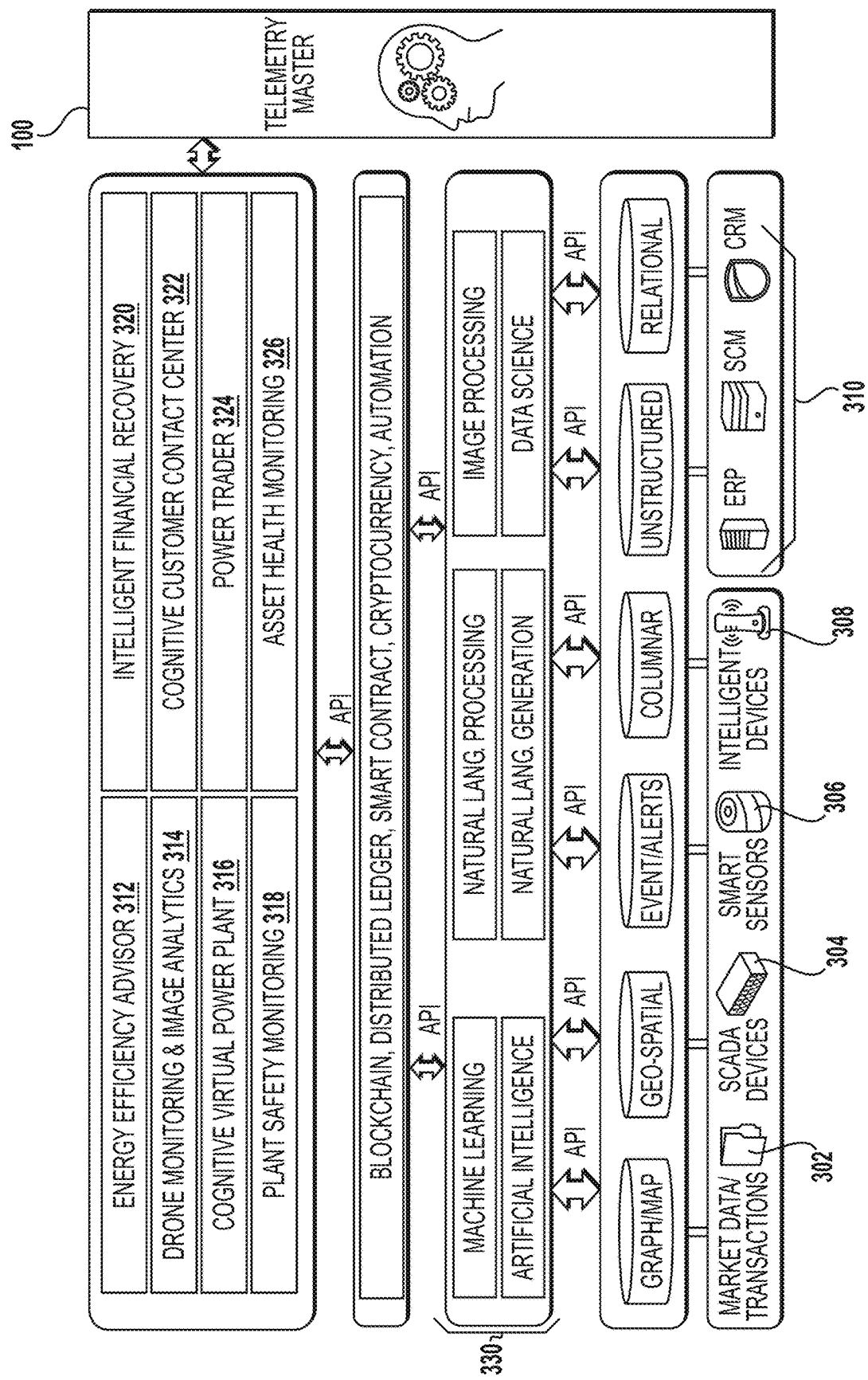
FIG. 3 shows the details of the TM system incorporated into a system for a utility plant in accordance with one example.

The TM system 100 as described herein can be incorporated into large establishments such as various utility companies, pharmaceuticals, factories, mines or transportation facilities such as airports and the like. Below is described an example of a utility system incorporating the TM system 100 or a utilities Cognitive and Adaptive Telemetry (U-CAT) system 300. FIG. 3 shows the details of the TM system 100 incorporated into a system for a utility plant to implement actions. The U-CAT system 300 is primarily made up of backend systems which include services that carry out market transactions 302, supervisory control and data acquisition (SCADA) devices 304, smart sensors 306, intelligent devices 308, and systems 310 for Enterprise Resource Planning (ERP), Supply Chain Management (SCM), Customer Relationship Management (CRM) and the like. The backend systems 302, 304, 306, 308 and 310 may produce and consume data of different formats including but not limited to, Graphs/Maps, geo-spatial, events/alerts, columnar, unstructured data and structured data such as relational data.

The TM system 100 employs APIs of various technologies 330 including but not limited to machine learning (ML), Artificial Intelligence (AI), natural language processing, natural language generation, image processing and data science to correlate the various types of data to administer the utility plant system efficiently thereby ensuring that the utility plant system runs smoothly. In order to be able to interface with the backend systems such as systems 302-310, a plurality of utility plant applications 312-326 are developed. These include but are not limited to, Energy Efficient Advisor 312, Drone Monitoring and Image Analytics 314, Cognitive Virtual Power Plant 316, Plant Safety Monitoring 318, Intelligent Financial Recovery 320, Cognitive Customer Contact Center 322, Power Trader 324 and Asset Health Monitoring 336. Each of the utility plant applications 312-326 may employ one or more of the technologies 320 to execute actions in accordance with examples described herein. In an example, the utility plant applications 312-326 may also include agents that execute scripts to carry out the various functions.

An example of analysis of a data entry is discussed below. It can be appreciated that the below analysis and other details are discussed only for illustration and that other analysis procedures can be adopted in accordance with examples disclosed herein. The logic buffer 208 initially pulls a data entry from the data buffer 202. An example of the data entry accessed by the logic buffer 208 is shown below:

Solar Panel: Cluster 1 Damaged, Area XYZ impacted

The above data entry can be checked for Cosine similarity amongst the data contained in the data buffer 202. Significantly matched entries will be removed from the data buffer 202. For example, the two data entries shown below have a Cosine similarity of one and thus one of the data entries corresponding to a prior entry can be removed from the data buffer 202.

'Cluster 1 Damaged, Area XYZ impacted.' 'Cluster 1 Damaged, Area XYZ impacted.'

The context buffer 204 in the content repository 102 can store contextual information from the above data entries.

Contextual Information: Cluster 1, Area XYZ

The data entry above can be used to generate a feature matrix and action to be executed can be determined by the predictive model 104 by using the feature matrix. The TM action processor 106 determines the various components or equipment that will execute the action. Keeping the TM SYSTEM 100 computationally effective. In an example, the equipment to execute the action is determined based on contextual information provided to the TM action processor 106 by the context buffer 204.

Newer data entries that are received at the data buffer after execution of the action at the one or more of the backend systems 132, 134 . . . will be provided to the logic buffer 208 and the above steps are repeated. In an example, each process can have a corresponding process ID tag to avoid data complexity. The data buffer 202 will continue to provide samples and the new sample values are added to the feature matrix. The generated feature matrix can be used for prediction. These steps are repeated till a decisive action that meets the confidence threshold is determined. The feature matrix generated after determining the decisive action is transferred to the learnt buffer 206. After a certain number of records are gathered in the learnt buffer. These records are sent to the train buffer 252. The predictive model 104 can be retrained using the data that has been received to date at the data buffer 202.

In an example, the agents 1220, 1240 included in the different applications can subscribe to receive each other's notifications. For example, if a solar panel is damaged, the power deficit can be identified and power can be automatically purchased based on subscriptions exchanged by the agents included for example, within the cognitive virtual power plant 316 and the power trader 324.

Figure 4A:
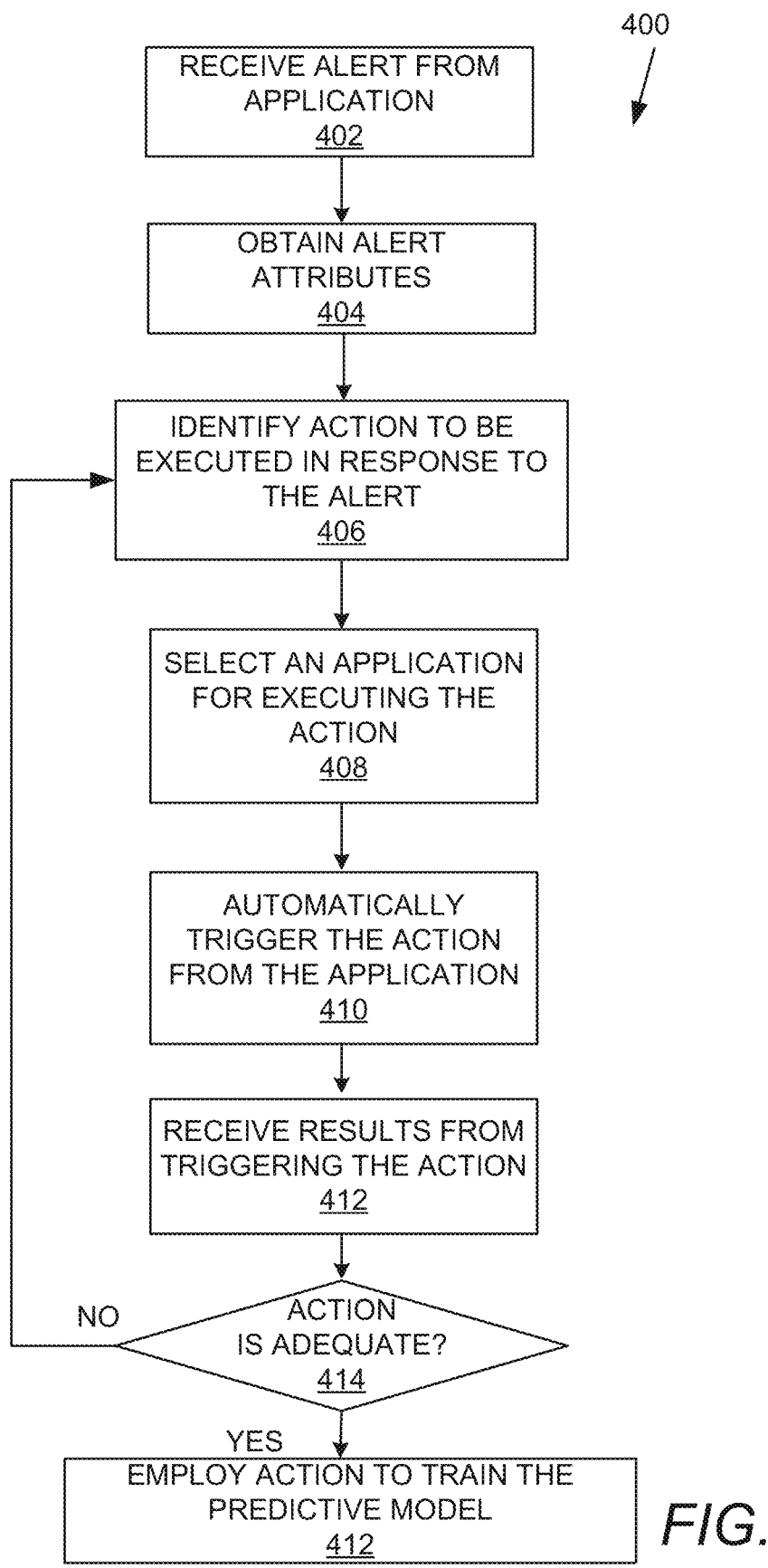
FIG. 4A shows a flowchart that details a method of monitoring a system such as the a utilities Cognitive and Adaptive Telemetry (U-CAT) system in accordance with some disclosed examples.

FIG. 4A shows a flowchart 400 that details a method of monitoring a system such as the a utilities Cognitive and Adaptive Telemetry (U-CAT) system 300 described above and intelligently triggering events and actions within the system as executed by the TM system 100. The method begins at 402 wherein an alert regarding a situation within the U-CAT system 300 is received. Examples of different situations that cause the alerts and how the alerts are handled are discussed infra. The alert may have been generated by one of the applications 122, 124, . . . due to a routine task, an anomaly, an automatic trigger or a human user action within one of the backend systems 132, 134 . . . The alert from the backend systems 132, 134 . . . is received by API of one of the applications 122, 124 that is configured to handle the alerts from the particular backend system. The application in turn logs the alert to the central repository 102 for processing by the TM system 100. Accordingly, at 404, the TM system 100 processes the alert and obtains the various alert attributes which may include the context information 1024. The context information 1024 can include application and/or the backend system generating the alert, the time, day and date of the alert, whether the alert was automatically generated or explicitly generated by a human user and the like. Based on the alert attributes, the TM system 100 may identify an action at 406 that is to be executed in response to the alert. At 408, an application for executing the action is selected and a message for triggering the action is transmitted to the selected application or the action is otherwise triggered automatically by the TM system 100 at 410. At 412, the results from the execution of the action are received and it is determined at 414 if the action was an adequate response to the alert or if further action(s) are required. If it is determined at 414, that the action was an adequate response, the information such as the data entries associated with the action can be transferred to the learnt buffer 206 for training the predictive model 104. Else the method returns to 406 to determine a further action to be executed.

Figure 4B:
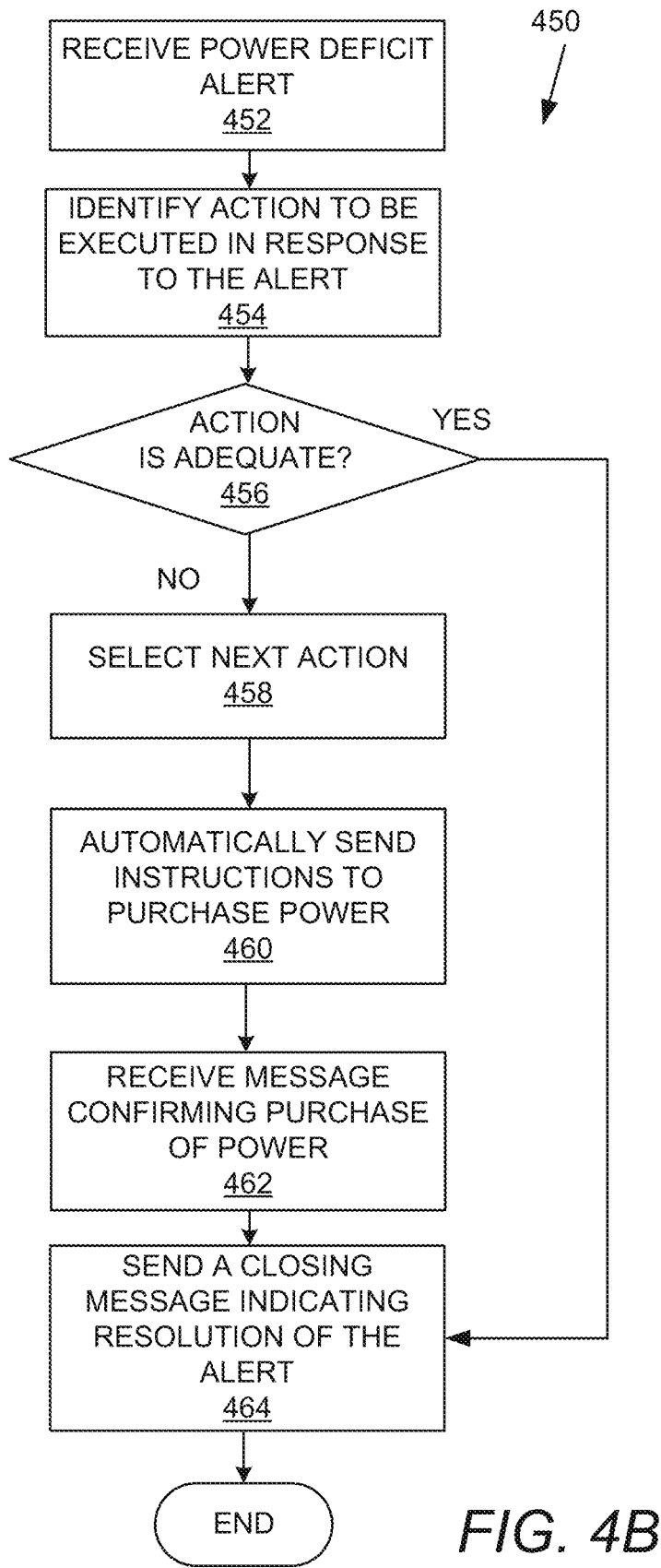
FIG. 4B is a flowchart that details a method of generating automatic actions in response to received alerts in a (u-CAT) system in accordance with one example.

FIG. 4B is a flowchart 450 that details a method of generating automatic actions in response to the received alerts in the (U-CAT) system 300. The method begins at 452 wherein an alert is received from the cognitive virtual power plant 316 which monitors the demand-supply gaps arising within the power utility establishment. The cognitive virtual power plant 316 may be trained to project power supply adequacy based, for example, on consumption and production patterns. Upon receiving the alert at 452, the TM system 100 may identify, for example, based on context information 1024, that a customer request action can be initiated at 454. So a request can be sent to customers to curtail their power usage or to stagger their power usage from peak times to non-peak hours. The number of customers to contact may be determined based on the amount of power required to address the gap while the identities of the customers to contact can be obtained, for example, from the cognitive customer contact center 322 which has information regarding customers who may sign up for the power savings program to obtain power at lower cost. The response from the customers is assessed at 456 to determine if the action initiated by the TM system 100, such as the customer request action at 454, adequately addresses the power deficit. In an example, if sufficient number of customers to adequately fill the power deficit through altered usage patterns can be identified from the customer request action, it can be determined at 456 that the action identified at 454 was sufficient to address the power deficit. The TM system 100 may send out a work order closing message at 464 indicating that the alert is resolved and the method terminates on the end block.

If it is determined at 456 that the action at 454 does not adequately address the power deficit or power shortage the method proceeds to 458 to select a next action such as, to automatically buy power in view of the context information 1024 that a customer request action was earlier initiated in response to the alert. The action at 454 may not adequately address the power deficit if only a subset of the customers who were contacted respond in the affirmative to the request to curtail or stagger their power usage. In order to execute the action to buy power, the TM system 100 can automatically send instructions at 460 to the power trader 324 to buy enough power to address the power deficit that is still left over after the restricted power usage by the customers responsive to the customer request action at 454. It can be appreciated that the automatic actions described herein are programmatically executed by the TM system 100 based on supervised/unsupervised training techniques.

In an example, the amount of power to be purchased may be determined by the cognitive virtual power plant 316 and communicated to the power trader 324 via the TM system 100. Upon receiving a message at 462 confirming the purchase of power, the TM system 100 may send out a closing message at 464 indicating that the issue with the power deficit alert is resolved and the method may terminate on the end block without circulating back to 456 to determine if the action initiated by the TM system 100 adequately addresses the power deficit.

Figure 5:
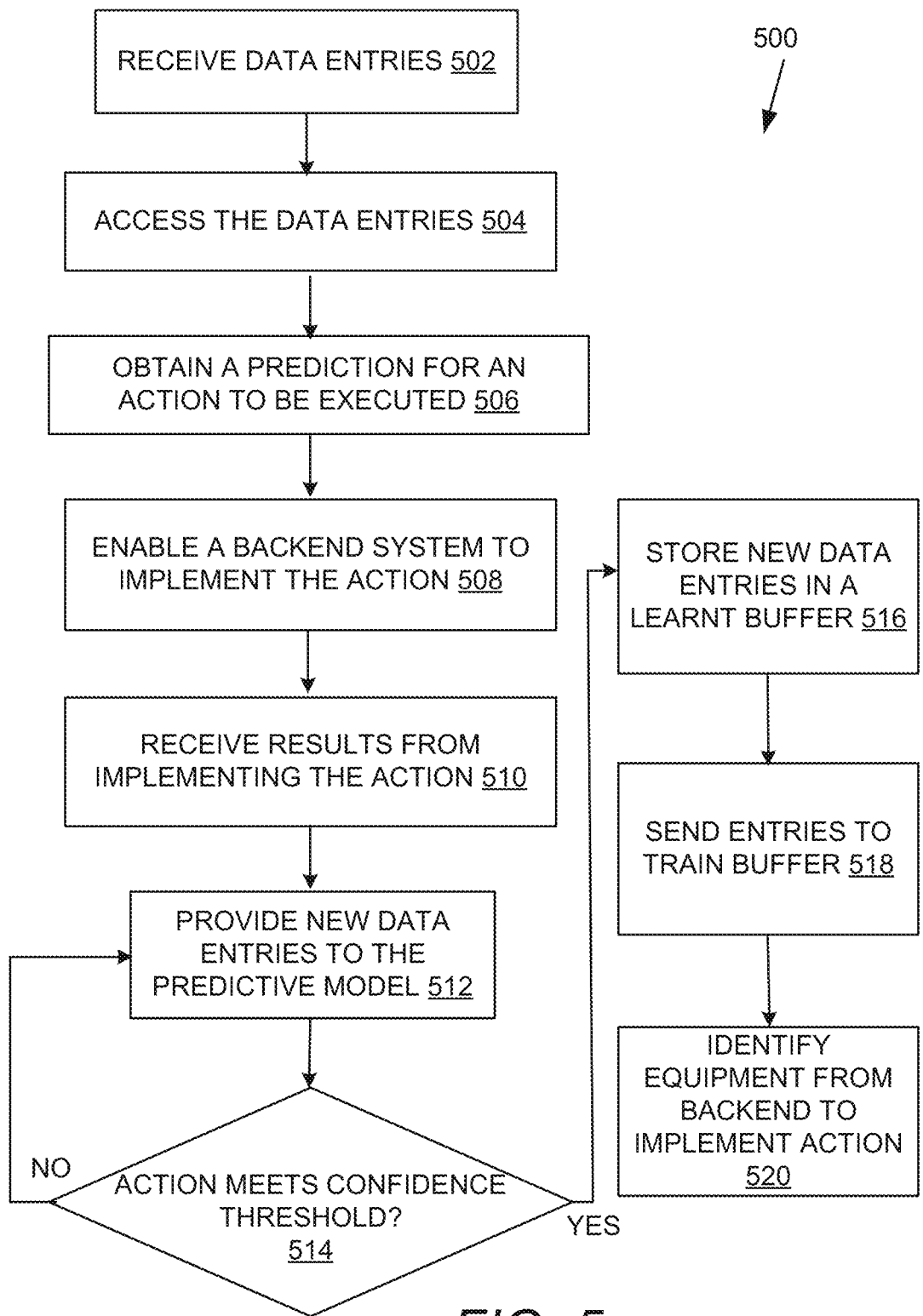
FIG. 5 shows a flowchart that details a method of monitoring a system and intelligently triggering events and actions within the system as executed by the TM system in accordance with one example.

FIG. 5 is a flow chart 500 that details a method of training a predictive model 104 to predict an action to be executed in accordance with examples disclosed herein. The method begins at 502 wherein data entries from a plurality of applications 122, 124 are received at the data buffer 202. Data stored in the data buffer 202 can relate to multiple processes or single process executing within one or more of the applications 122, 124. In an example, similarities between prior data entries stores in the data buffer and the data entries received at 502 can be estimated and prior entries that are similar to the received entries can be deleted from the data buffer 202. The data entries are accessed at 504 from the data buffer by the logic buffer 208. The data entries are provided to the predictive model 104 and a prediction of an action to be executed is obtained at 506. In an example, the data entries can include corresponding process IDs so that the data entries are provided to the predictive model 104 upon accumulation of sufficient predefined number of data entries in the data buffer 202.

At 508 one of the backend systems 132, 134 . . . is enabled to implement the action predicted at 506. The results from the implementation of the action are received at 510 via new data entries arriving at the data buffer 202 subsequent to the implementation of the action at one of the backend systems 132, 134 . . . . The new data entries are again provided at 512 to the predictive model 104 for predicting another action to be implemented. In an example the new data entries are again checked for similarities with prior data entries and significantly matching prior entries are removed from the data buffer 202. The logic buffer 208 continues to provide the new data entries to the predictive model 104 until the other action is determined with confidence (e.g., probabilities) that meets a predetermined confidence threshold. Accordingly it is determined at 514 if an action that meets the confidence threshold is identified.

Upon identifying the action which meets the confidence threshold, the logic buffer 208 will store the new data entries in a learnt buffer 206 at 516 and the logic buffer 208 is refreshed. After a certain predetermined number of data entries which meet a predefined data threshold are gathered in the learnt buffer 206, these data entries are sent to the train buffer 252 at 518. The TM action processor 106 is employed at 520 to identify equipment from the backend systems 132, 134 . . . that will implement the other action. If at 514, it is determined that the action does not meet the confidence threshold then the logic buffer 208 continues to provide the new data entries to the predictive model 104 until the other action which meets the confidence threshold is identified. Therefore the method returns to 512 to provide the new data entries to the predictive model 104.

Figure 6:
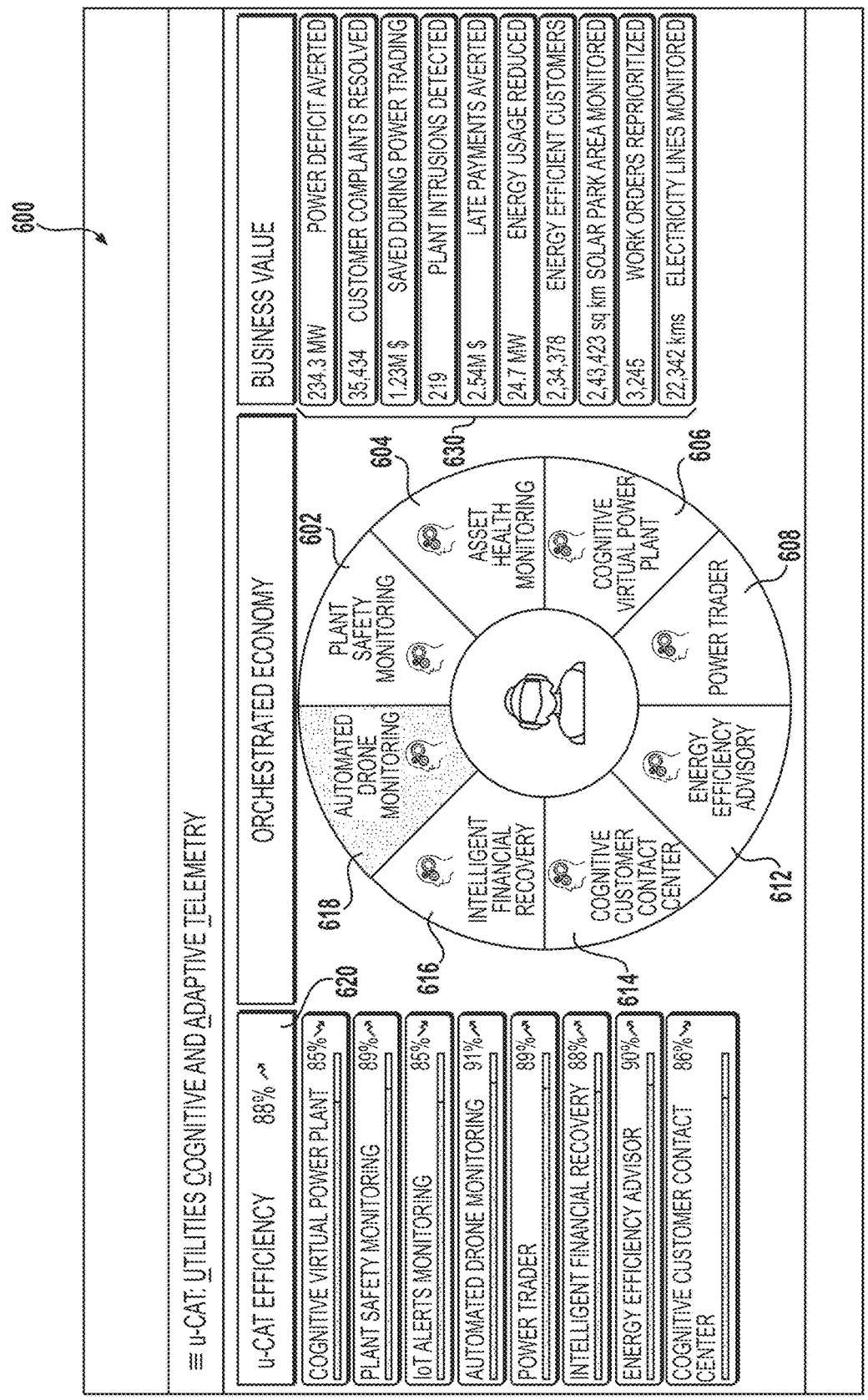
FIG. 6 shows the home page for the (u-CAT) system in accordance with an example.

FIG. 6 shows the home page 600 for the (U-CAT) system 200. The home page 600 provides respective links 602, 604, 606, 608, 612, 614, 616, 618 to each of the eight applications 312-326 included in the u-CAT system 300. The home page 600 also includes data 620 regarding the efficiency obtained from each of the applications 312-326 by implementing the u-CAT system 300. Also included, is the data 630 regarding the output obtained from the applications 312-326. It can be appreciated that each of the functions shown under 630 such as power deficit averted, the customer complaints resolved, dollars saved during power trading, plant intrusions detected, dollars averted in late payments, megawatts of energy usage reduced, number of energy efficient customers achieved, monitoring of the solar park, reprioritizing the work orders and monitoring of electricity lines are automatically achieved by the TM system 100 implemented with the u-CAT system 300.

Figure 7A:
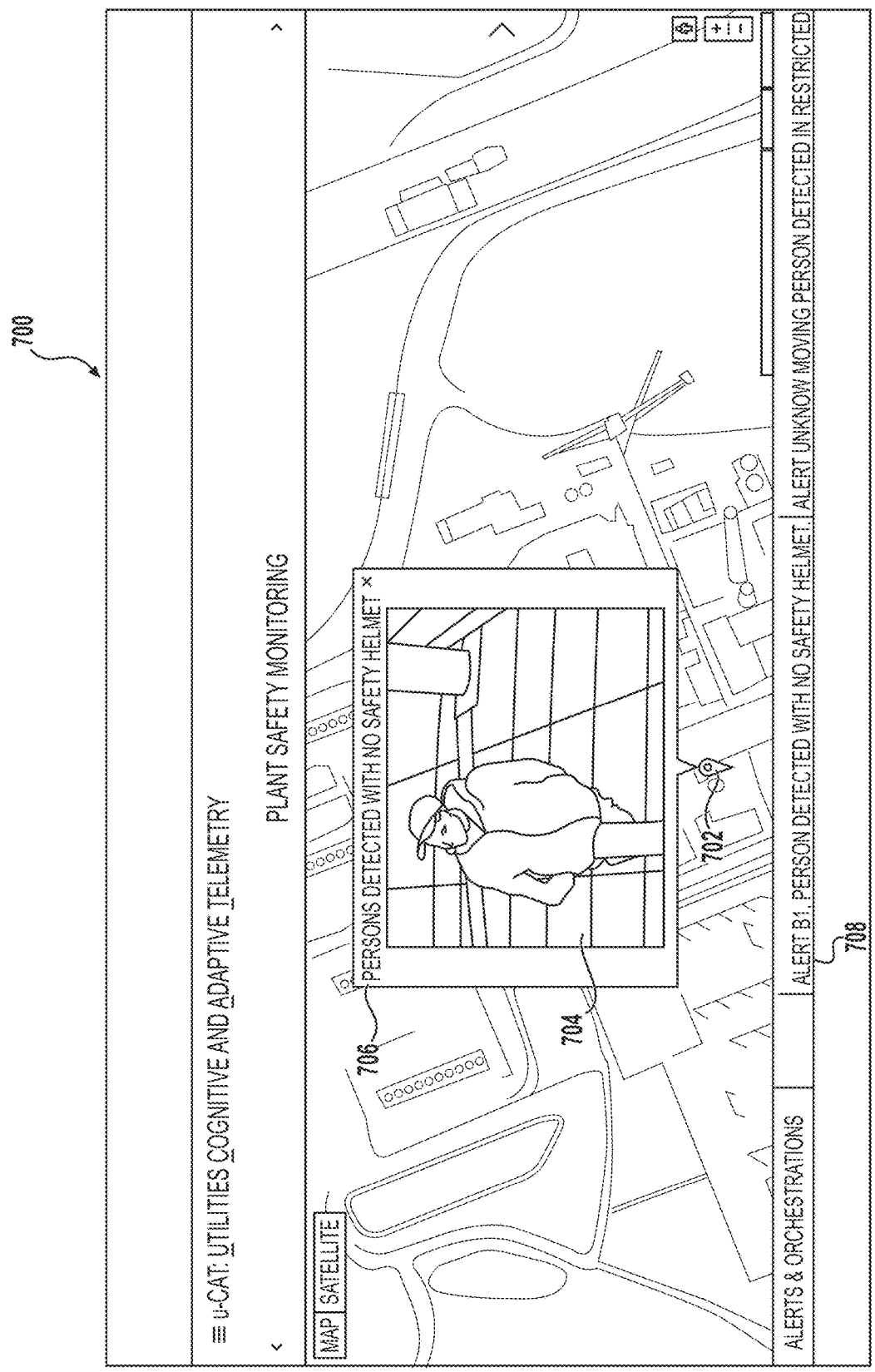
FIGS. 7A and 7B respectively show displays that are generated by the plant safety monitoring application while monitoring a location in accordance with one example.
Figure 7B:
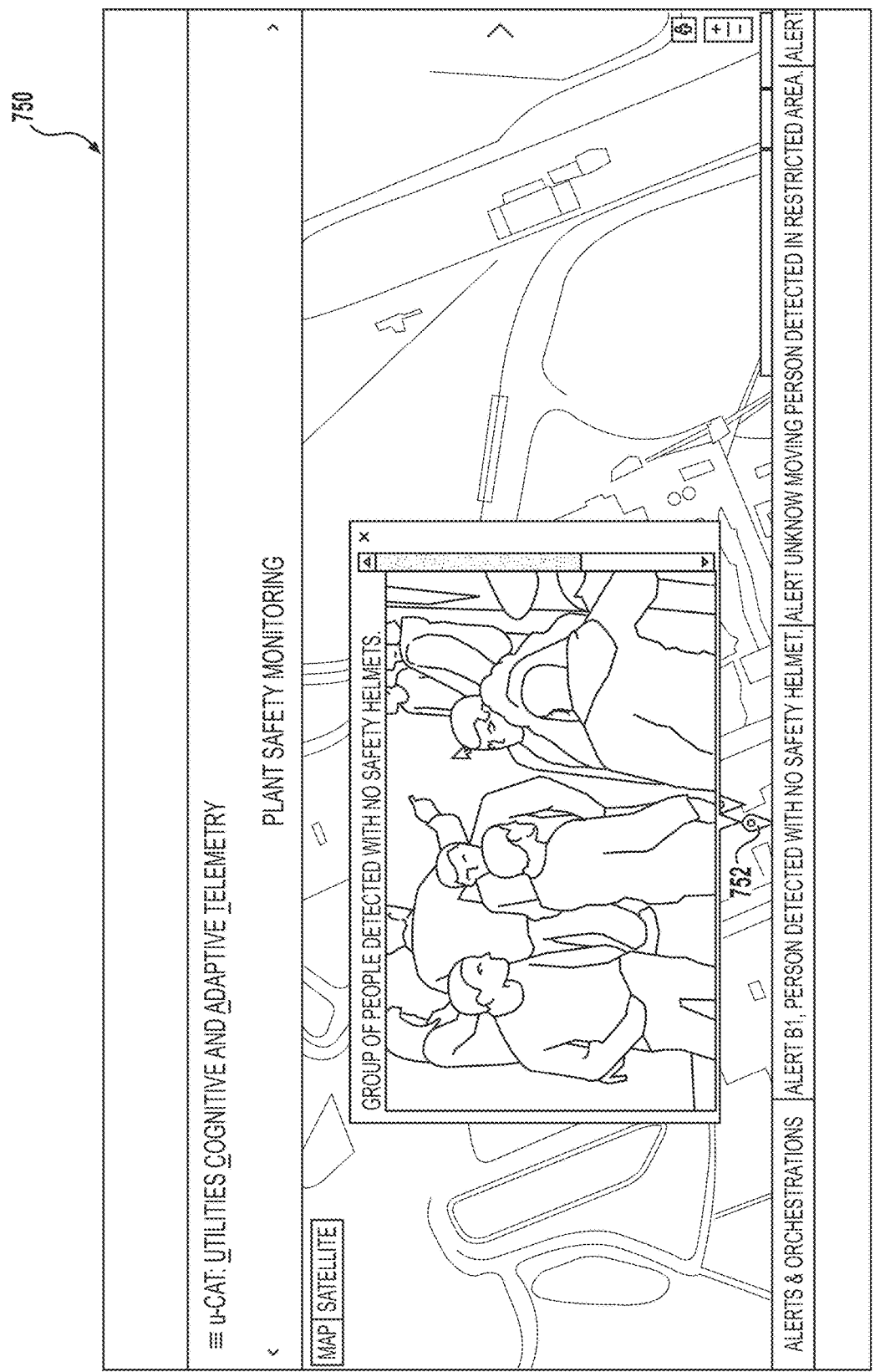

FIGS. 7A and 7B respectively show displays 700 and 750 that are generated by the plant safety monitoring 318 while monitoring a location. The display 700 may be accessed, for example, via clicking the plant safety monitoring link 602. In an example, if the plant safety monitoring 318 is employed for multiple sites, a plurality of selectable displays may be shown. The display 700 indicates via a marker 702 in real-time, a location of a safety violation within one of the monitored locations. When selected by the user, the marker 702 generates a video display 704 of the safety violation as it is occurring along with a description 706 of the safety violation. A ticker tape 708 of the violations occurring in the monitored locations is also generated.

FIG. 7B shows the display 750 of another safety violation occurring at a different spot within the monitored location. The display 750 may be accessed by selecting another marker 752.

Figure 8:
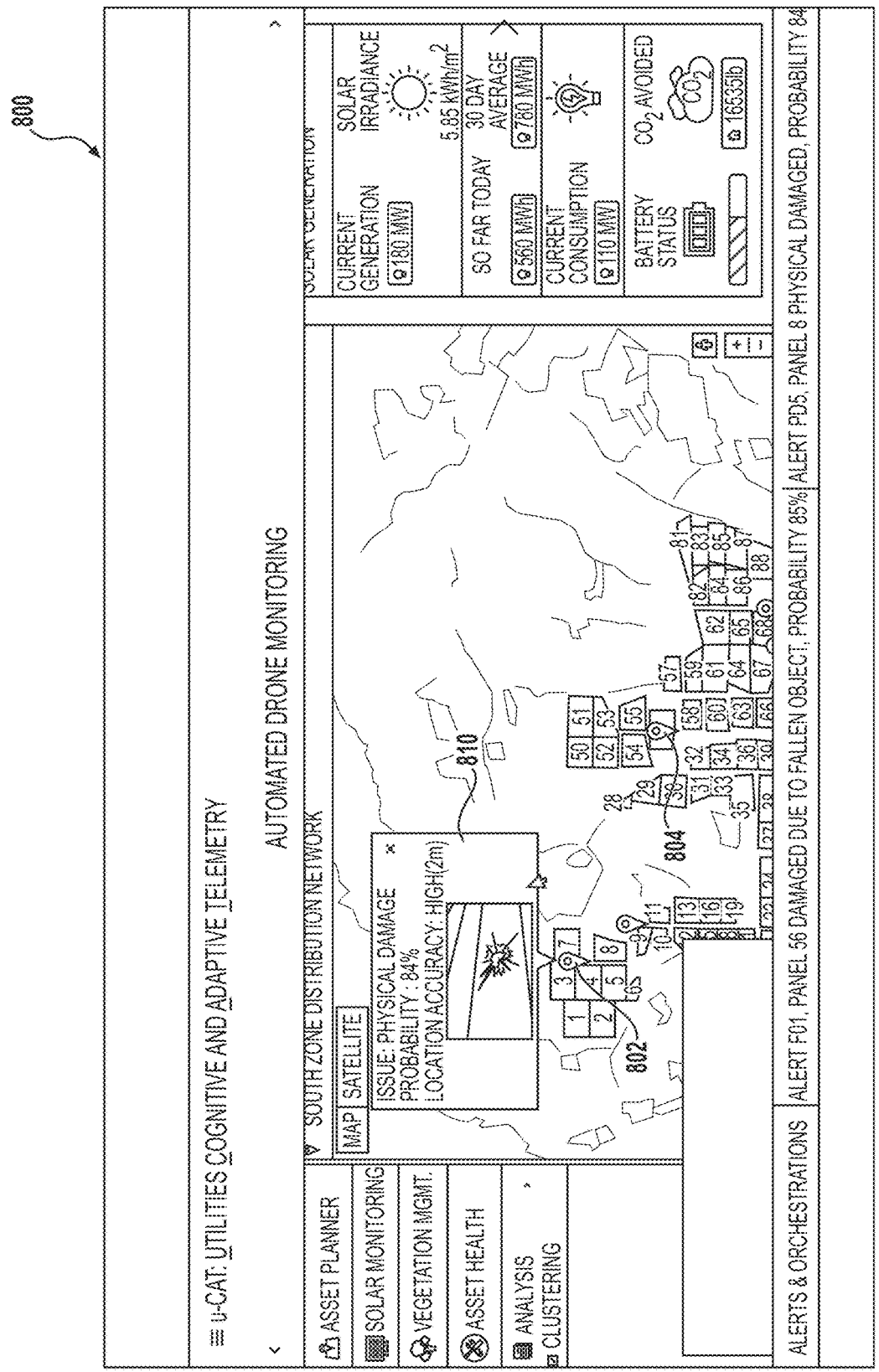
FIG. 8 shows a display of a geographical location being monitored for example, by unmanned aerial vehicles such as drones in accordance with one example.

FIG. 8 shows another display 800 of a geographical location being monitored for example, by unmanned aerial vehicles such as drones. The drones may be administered by an application for automated drone monitoring and image analytics 314. The automated drone monitoring and image analytics 314 receives output from cameras on the drones to generate the display 800 which also includes markers 802, 804 wherein selection of the marker 802 generates a display 810 which shows a video or an image of a probable physical damage such as a broken solar panel, the likelihood of the physical damage and the accuracy with which the location of the probable physical damage is identified. Similarly, selection of the marker 804 may display another physical damage at a different physical location within an area monitored by the drones.

The displays 700, 750, and 800 are generated by applying image analysis techniques and classifiers trained to differentiate between images so that anomalies such as safety violations or physical damages to assets can be recognized and bought to the attention of appropriate personnel. In the case of a person without a safety helmet, image classifiers may be trained on images of people with helmets and without helmets in order to automatically identify the differentiation. Similar safety violations such as lack of proper uniform, suits, masks and the like may be identified. Anomalies may also be identified via data obtained from sensors on the drones which may include heat sensors, pressure sensors, light sensors, gas sensors, humidity sensors or other sensors. The signals emitted by the sensors are received by the corresponding applications such as for plant safety monitoring 318, or automated drone monitoring and image analytics 314. The APIs employed by the plant safety monitoring 318, or automated drone monitoring and image analytics 314 applications are configured to generate alerts that are capable of being logged to the central repository 102 and processed by one or more of the predictive model 104 or the TM Action processor 106.

Again, as mentioned herein the agents associated with the applications for the asset monitoring 326, cognitive virtual power plant 316 and the power trader 324 can exchange notifications via the TM system 100. Therefore, when a breakage of a solar panel is determined by the asset monitoring 326 application, an interruption of power supply or a power deficit that can be expected may be projected by the virtual power plant 316. The virtual power plant 316 can further communicate with the power trader 324 via respective agents to purchase power that can compensate for the power deficit projected due to the broken solar panel. Therefore, even when assets are not performing to capacity, the interconnections between the various applications in the U-CAT system 300 can lead to uninterrupted power supply.

Figure 9:
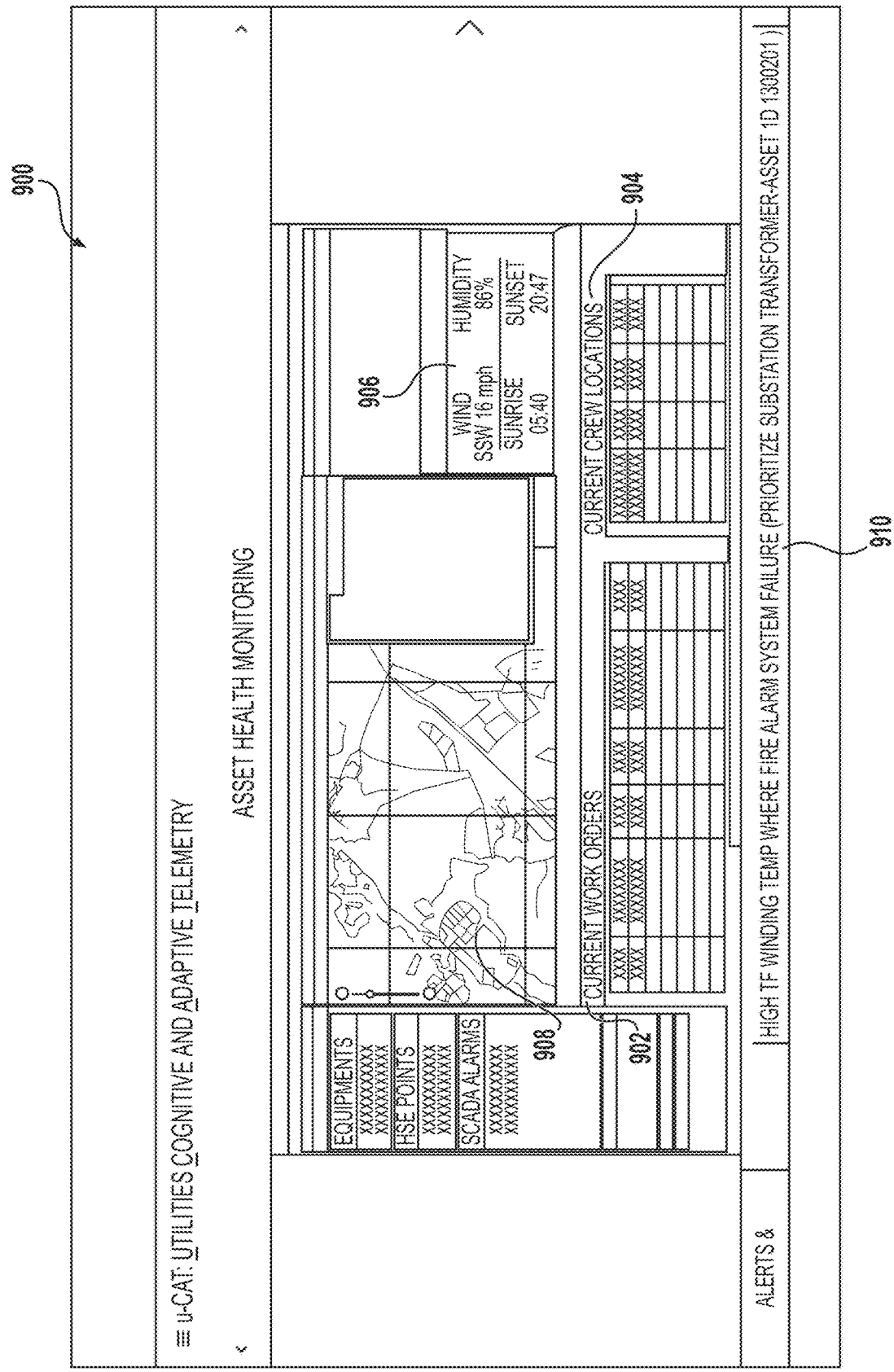
FIG. 9 shows an asset monitoring display generated by an asset monitoring application in accordance with one example.

FIG. 9 shows an asset monitoring display 900 generated by an application for asset monitoring 326. It includes data for current work orders 902, current crew locations 904, current weather conditions 906 at a selected location 908. In addition, it can include a ticker tape 910 which shows work orders that were automatically prioritized by the TM system 100 based on the data from the sensors at the location 909, the current weather conditions 906 and the context information 1024.

Figure 10A:
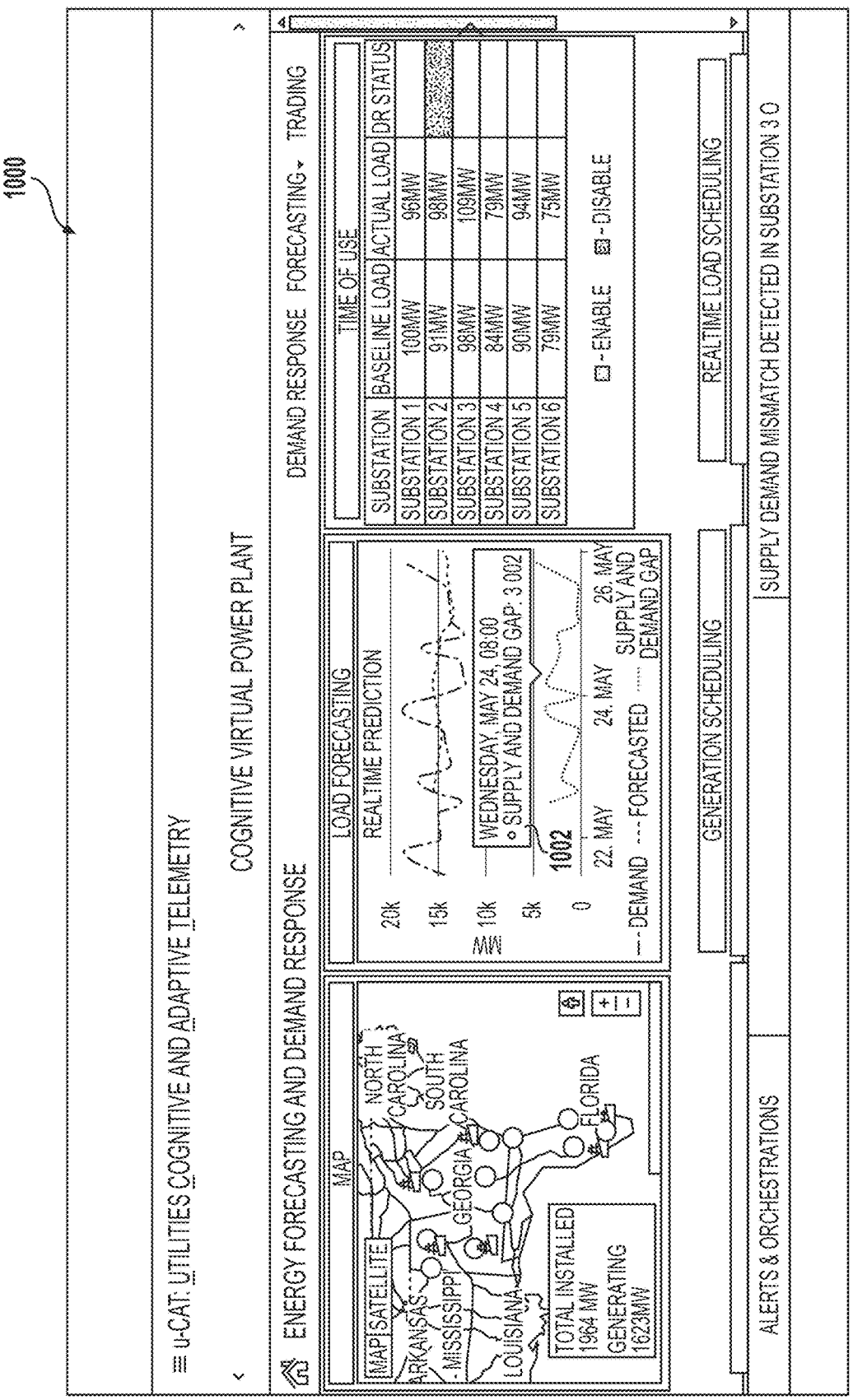
FIGS. 10A and 10B illustrate displays generated by an application for a cognitive virtual power plant in accordance with one example.

FIG. 10A illustrate an energy forecasting display 1000 generated by an application for a cognitive virtual power plant 316 which provides real-time predictions regarding how one or more power supply sources track their respective current demands. The energy forecasting display 1000 shows a supply gap or deficit at 1002.

Figure 10B:
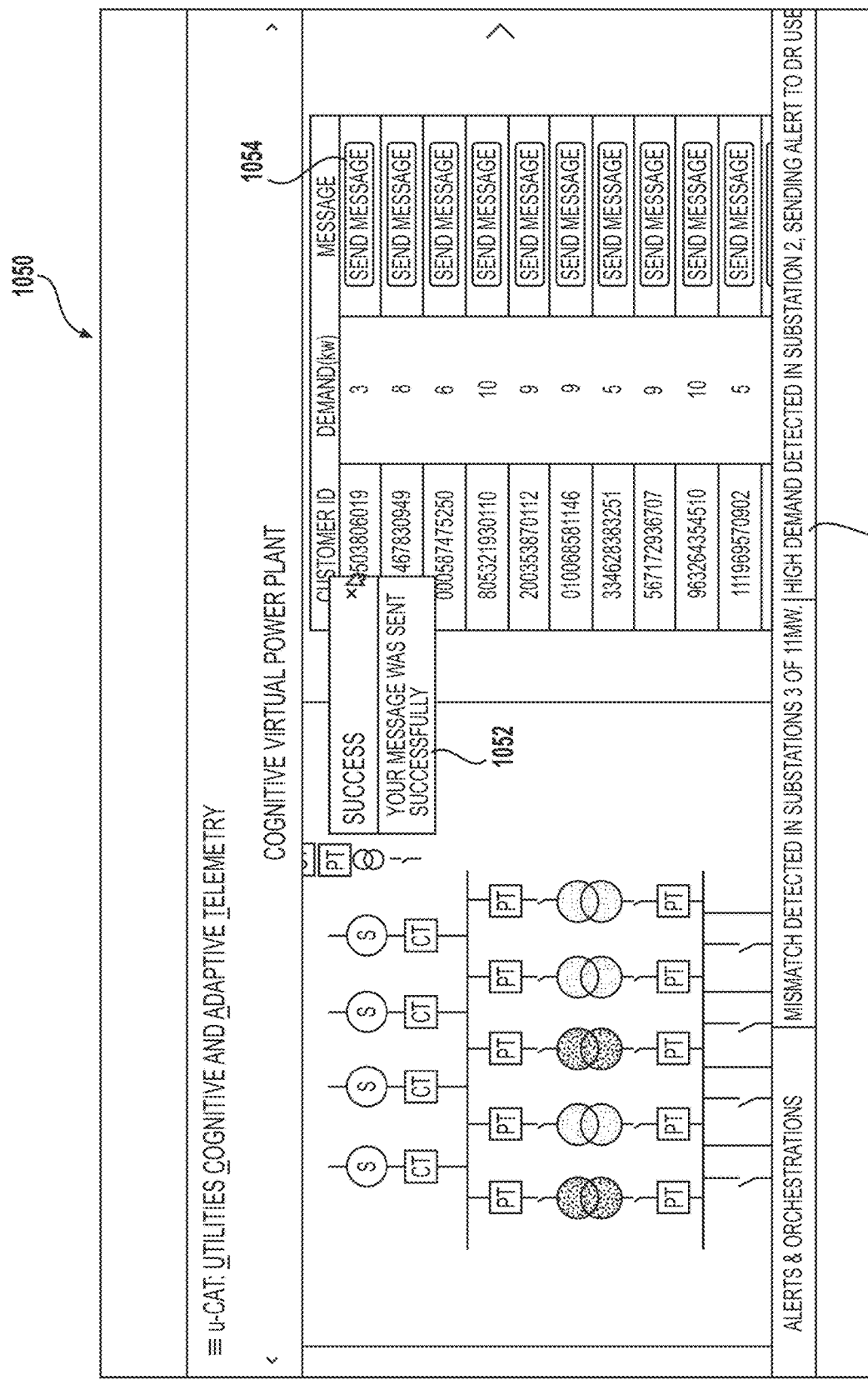

FIG. 10B shows another display 1050 generated by the cognitive virtual power plant 316 wherein a message to buy power is successfully transmitted as conveyed by the pop up 1052 when a send message button 1054 was manually operated. In addition, the ticker tape 1060 shows statuses of the various substations such as sending a demand-response (DR) alert for substation 2 or buying power for substation 5. The u-CAT system 200 therefore enables actions such as purchasing of power to be executed either programmatically by the power trader 324 or manually by a human user.

Figure 11:
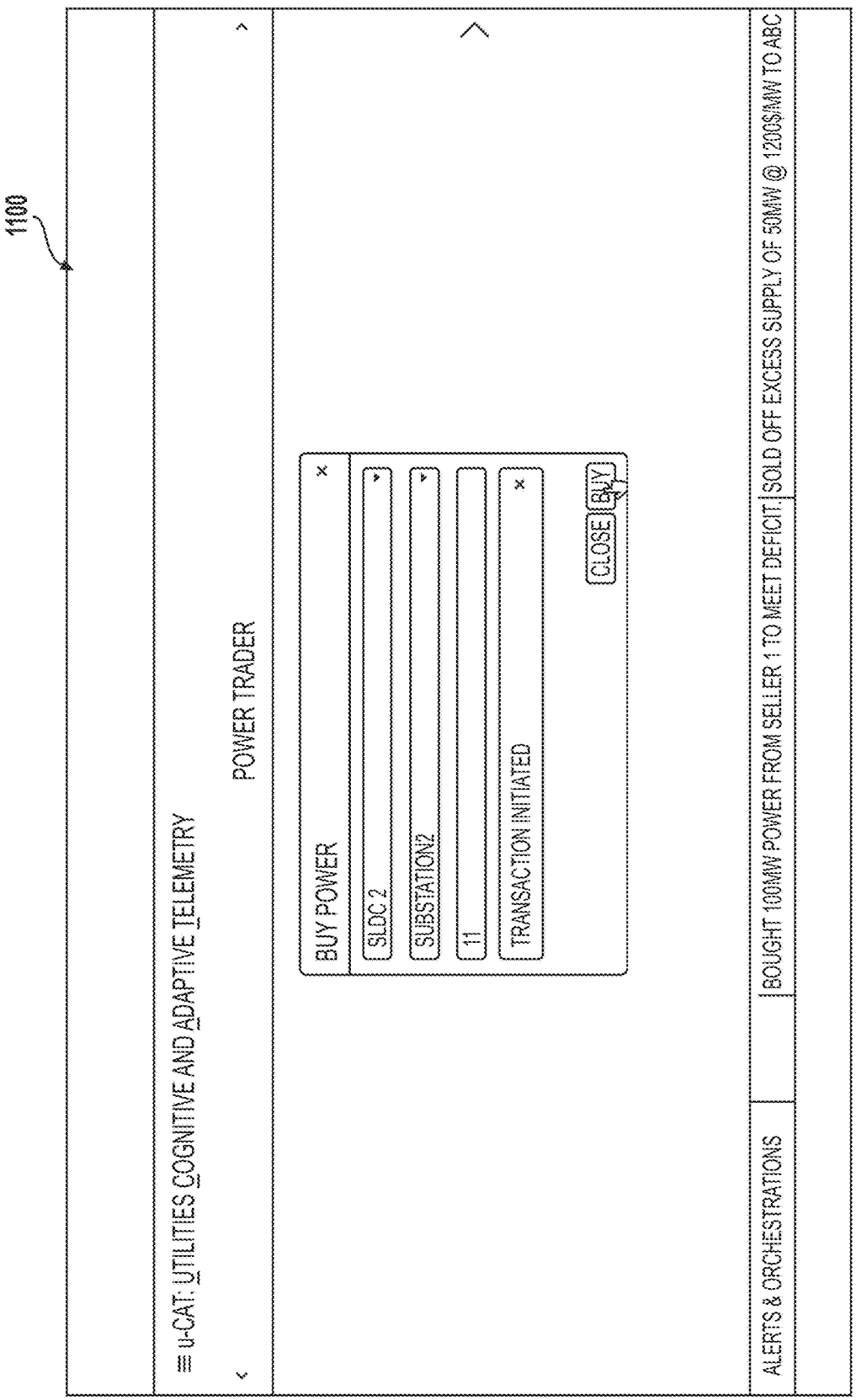
FIG. 11 is a display generated by the power trader in accordance with one example.

FIG. 11 is a display 1100 generated by the power trader 324 wherein a transaction to buy power for substation 2 is initiated.

Figure 12:
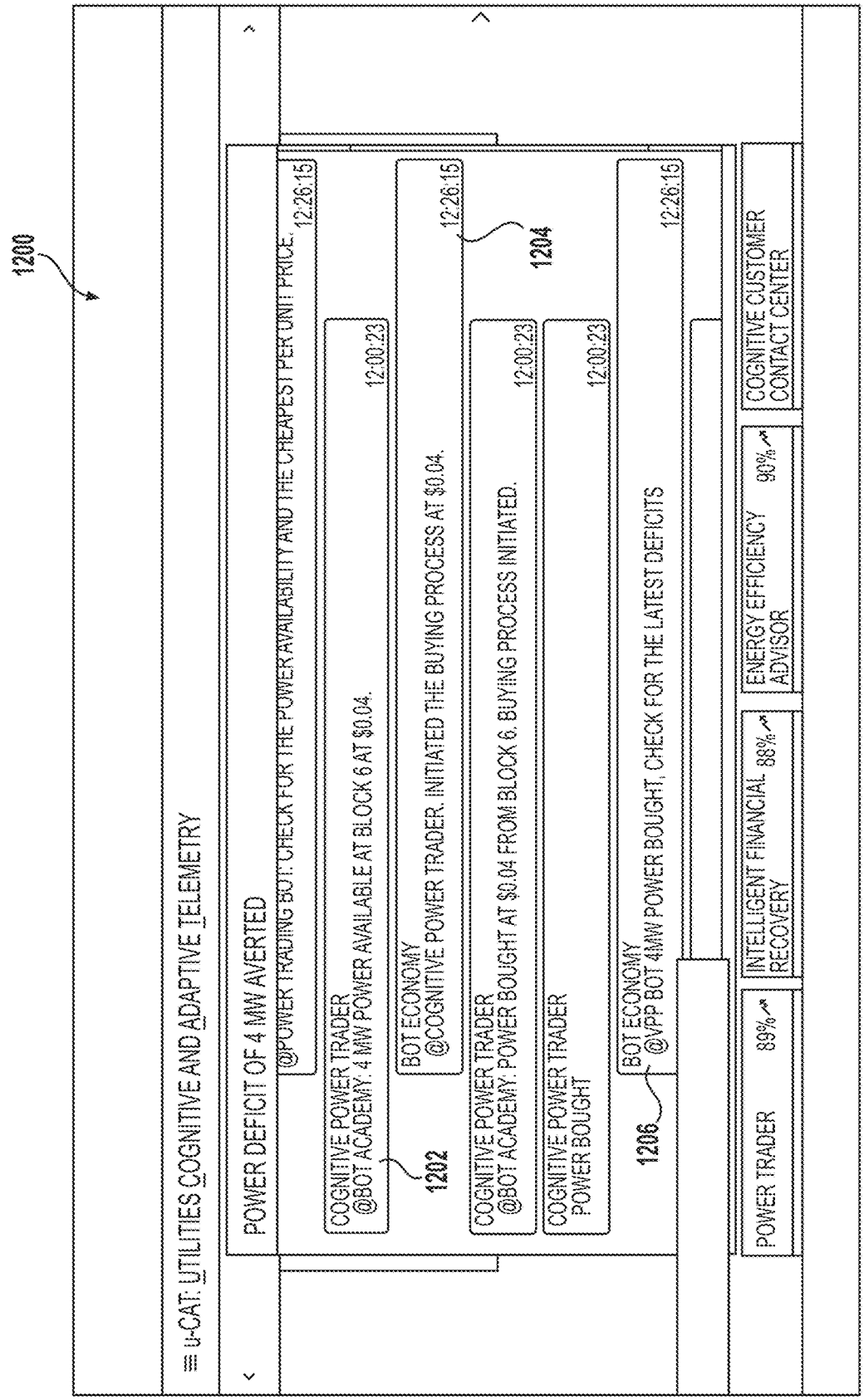
FIG. 12 shows a log of the messages exchanged between two applications, in accordance with one example.

FIG. 12 shows a log 1200 of the messages exchanged between the power trader application and the TM system 100 respectively during a power purchase operation that is programmatically initiated. As seen from the log 1200, the power trader 324 application receives instructions from the TM system 100 to buy power. When the power trader 324 completes the transaction, a message is passed on by the power trader application to the TM system 100 confirming the purchase transaction. Furthermore, as mentioned earlier with respect to FIG. 3, the TM system 100 may further cause the application for the cognitive Virtual power plant 316 to determine if the purchase of power is adequate by requesting data regarding power deficits as shown at 1206.

As mentioned herein, the application layer 120 includes various intelligent agents 1220, 1240 associated with different applications. The agents 1220, 1240 and the like may be programmed to access various APIs to carry out the functions of the platforms such as the u-CAT system 200 with which they may be associated. In an example, the application layer 120 may include the master agent 150 which is configured to enable exchange of communications between the agents associated with an application such as the U-CAT system 300. In an example, the master agent 150 can enable agents to exchange communications over a network. In the examples described above, the master agent 150 can facilitate agents 1220 and 1240 to subscribe to each other's notifications. Accordingly, conversations such as those shown in 1200 can be automatically implemented. In an example, an agent may be a program acting on behalf of a user or another program to execute functions that simulates human activity. Agents may also include hardware elements such as smart sensors or other smart appliances that can be made accessible as independent elements on a network.

Figure 13:
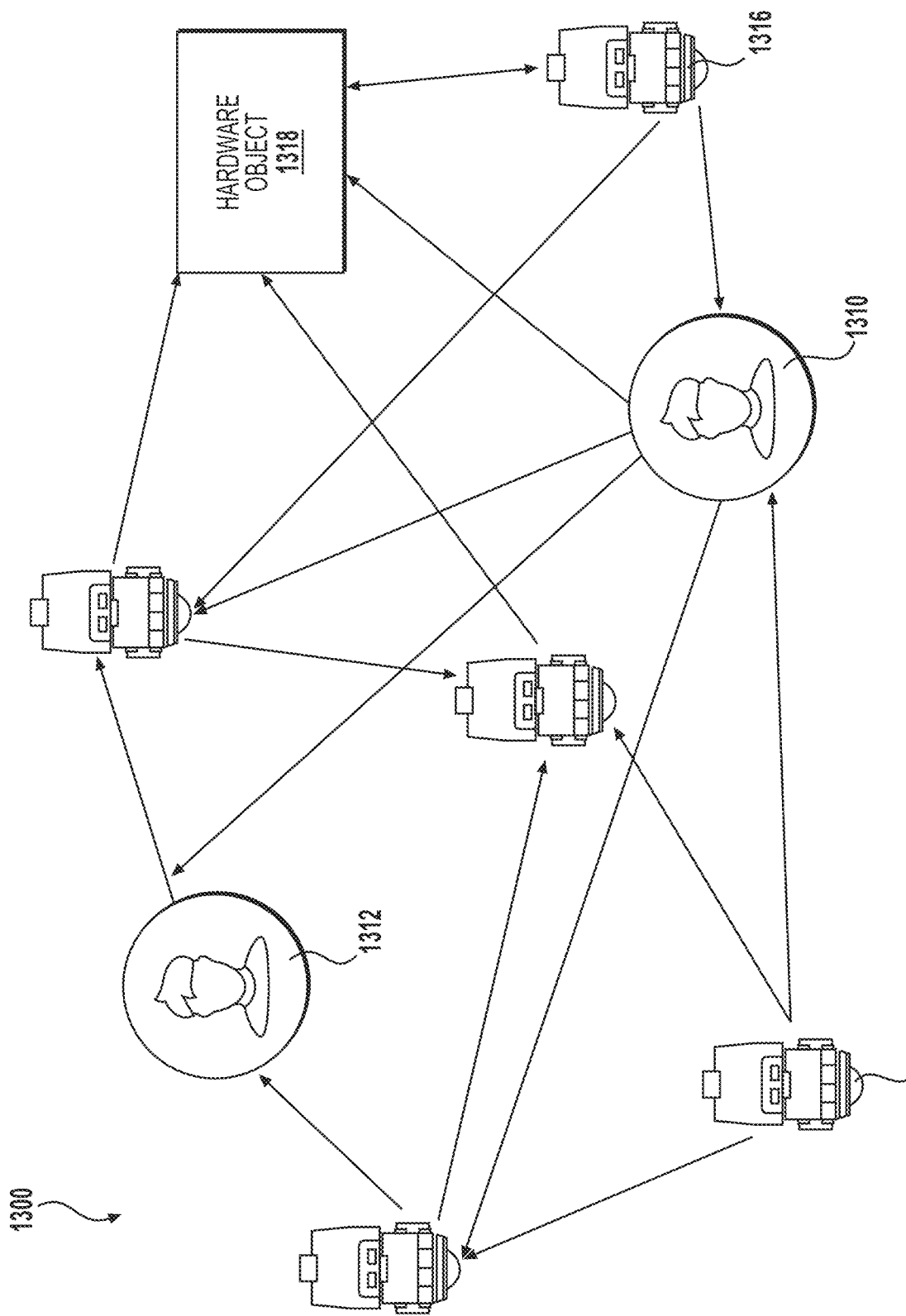
FIG. 13 shows a public network of various members which may include, applications, hardware objects and human users in accordance with one example.

In an example, the master agent 150 may also be configured as an independent network administering utility controlling functions of a public network of various types of members which may include, not only agents acting on behalf of other human users and programs but also other applications, hardware objects and human users. FIG. 13 shows a public network 1300 of various members which may include, not only agents 1314, 1316 acting on behalf of other human users and programs but also other applications, hardware objects 1318 and human users 1310, 1312. For ease of description and brevity, the members of the network 1300 will be divided into agent members which may include agents, applications, hardware elements and the like and human members. The hardware elements can include without limitation sensors, smart electronic/electric devices, large and small industrial machinery or other elements which are configured with communication interfaces that enable the elements to communicate on the agent network. The network 1300 therefore enables connecting personal appliances to commercial machinery or networks.

Each member of the network 1300 may have a unique network id that enables other members to initiate communication with the member. For the agents on the network, communication is enabled via, for example, an IP (Internet Protocol) address on the network 1300. A human user may be reached via the member's unique network id which may be linked to the member's communication channel such as a cellular phone or an email or other channels on which the human user can receive messages. While the agent members 1314, 1316, 1318 may be part of the network 1300, it can be appreciated that at least a subset of the interactions of the agent members 1314, 1316 and 1318 may be controlled by the human administrators that are responsible for connecting the agents 1314, 1316, 1318 to the network. In an example, the human members 1310, 1312 and the agent members 1314, 1316, 1318 may subscribe to receive events emitted by the other members. The agent members 1314, 1316, 1318 may be configured with limited autonomies or automatic functions on the network 1300 wherein subscriptions from other network members may be automatically accepted regardless of whether the subscribing member is a human or agent member, if the subscribing member satisfies certain authentication criteria. The authentication criteria may be verified by the master agent 150 and included with the subscription information. In some examples, the agent members 1314, 1316, 1318 may require their respective human administrators to accept or reject subscriptions that they receive from other network members. If the network 1300 is a public network, any agent or human user who has capabilities or communication channels to exchange communications with other members may sign up for membership on the network 1300.

When a subscription is accepted by a member of the network 1300, the events or information emitted by the member may be pushed to the subscribing members. For example, some of the agent members 1314, 1316, 1318 may be sensors or applications detecting or monitoring weather or other local conditions of geographical locations. Then other network members may subscribe to the sensors or applications to obtain the latest updates on the weather conditions, natural calamities such as floods, fires, earthquakes and the like within the monitoring areas of the agents. In an example, the members of the network 1300 may exchange messages in one-to-one format or many-to-one format.

Figure 14:
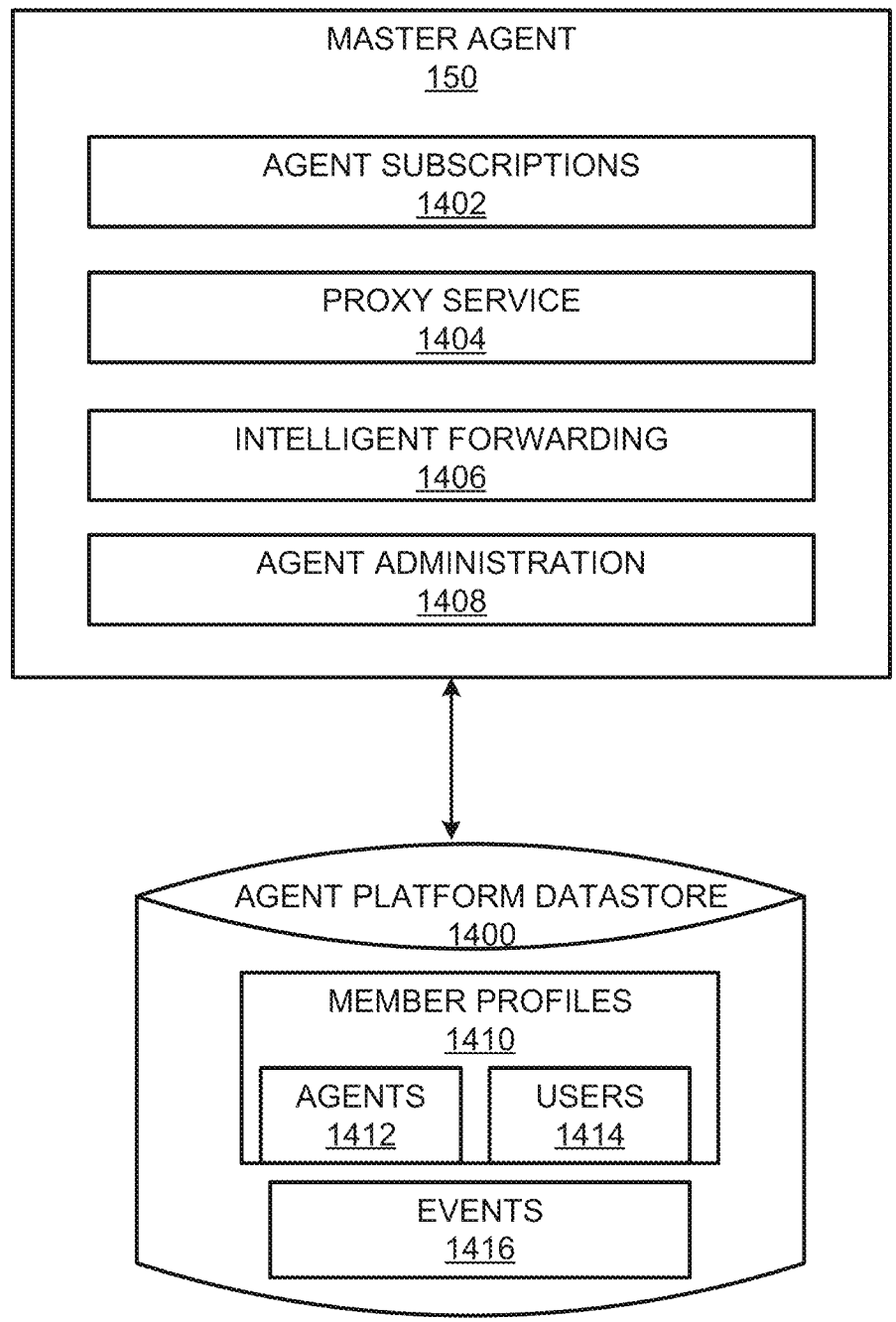
FIG. 14 is a block diagram of a master agent in accordance with one example.

FIG. 14 is a block diagram of the master agent 150. In an example, the elements of the master agent 150 may be an independent network administering utility controlling functions of the network 1300. The master agent 150 may include subscription APIs 1402 for managing subscriptions of the network members 1310, 1312, 1314, 1316 and 1318, APIs for proxy service 1404 which enable proxies that can act on behalf of an agent, APIs for intelligent forwarding of requests 1406 to the appropriate members and optionally APIs for agent administration 1408. Accordingly, the master agent 150 may enable the agents to exchange messages, subscribe to events emitted by other agents on the network 1300, enable proxies that can act on behalf of an agent to prevent business disruptions and intelligent forwarding of requests to the right agents. Agent administration can include o functions such as maintaining information regarding the agent members, enabling agents to connect to each other via APIs on integration platforms such as Dell boomi and the like. The agent master agent 150 also includes APIs for agent administration 1408 which enables identifying and disabling spam agents that tend to flood the network 1300 with large amount of messages or spy agents that do not contribute to the communications on the network 1300 except for collecting information from the network 1300 and the like. Similarly the master agent 150 may also include APIs to remove inactive agents.

The master agent 150 may be coupled to an agent platform data store 1400 which stores data required for the smooth functioning of the network 1300. The agent platform data store 1400 stores member profiles 1410 including agent profiles 1412 and user profiles 1414. While certain data such as but not limited to, date of signing up to the network 1300, the members subscribed to, the members who subscribed to the profiled member, member ratings such as ratings of the member associated with the member profile and the like may be common to both the agent profiles 1412 and the user profiles 1414, certain data may differentiate an agent member from a human member. Agent profiles 1412 may contain data not included in the user profiles 1414 which may include but is not limited to, the managing user for the agent member associated with the agent profile, the IP address of the agent member used for receiving and sending messages, the description of services if any provided by the agent member, the member ratings of the agent member's services, information regarding the proxy agents which may include one or more other agent members acting as proxies for the agent member and one or more other agent members for which the profiled agent member acts as a proxy. In addition to the member profiles 1410, the agent platform data store 1400 may also store the various events 1416 generated by the members of the network 1300 in order to transmit the events to the subscribing members.

Figure 15:
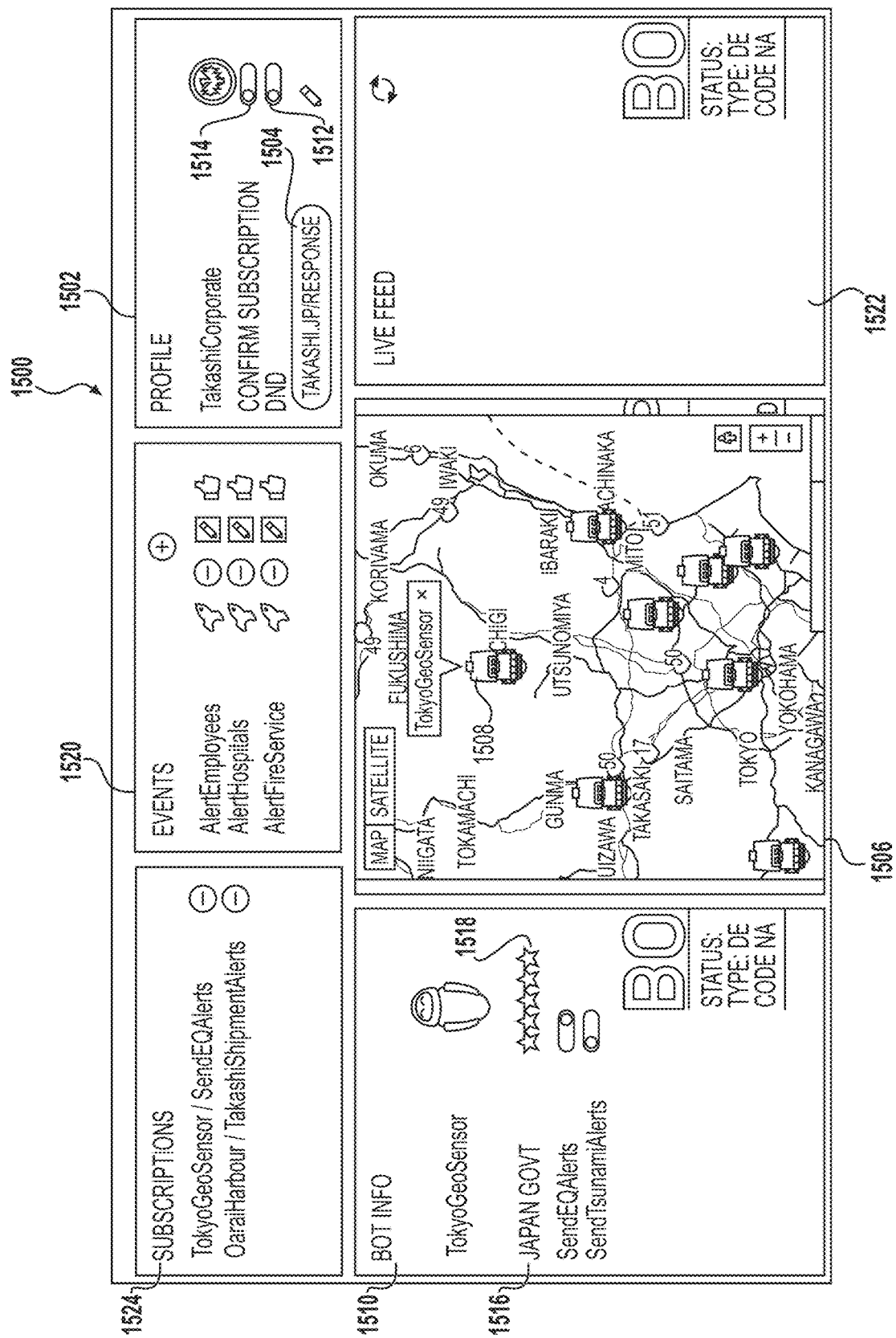
FIG. 15 shows a user interface generated by the master agent in accordance with one example.

FIG. 15 shows a user interface 1500 generated by the master agent 150 in accordance with one example. The user interface 1500 shows the profile 1502 of an agent member 'TakashiCorporate' which includes user attributes such as but not limited to the status 1512 currently set to do not disturb (DND), confirm subscription option 1514 and whose communication link 1504 takashi.jp/response may be used by the network 1200 or the master agent 150 to communicate with TakashiCorporate. The user interface 1500 includes a geographical display area 1506 that displays the agents currently located in geographic proximity to 'TakashiCorporate'. The geographical display area 1506 includes selectable icons for the agents currently proximate to 'TakashiCorporate' and when an agent named TokyoGeoSensor 1508 is selected, the information regarding the selected agent is shown in the agent info area 1510 which includes information regarding the administrative member 1516 of the agent and a rating 1518 of the agent. The subscriptions of TakashiCorporate are shown in the subscriptions area 1524 and an events area 1520 of the user interface 1500 includes events emitted by the TakashiCorporate agent. A live feed area 1522 shows the live feeds from the various members of the network 1200 subscribed to by TakashiCorporate.

Figure 16:
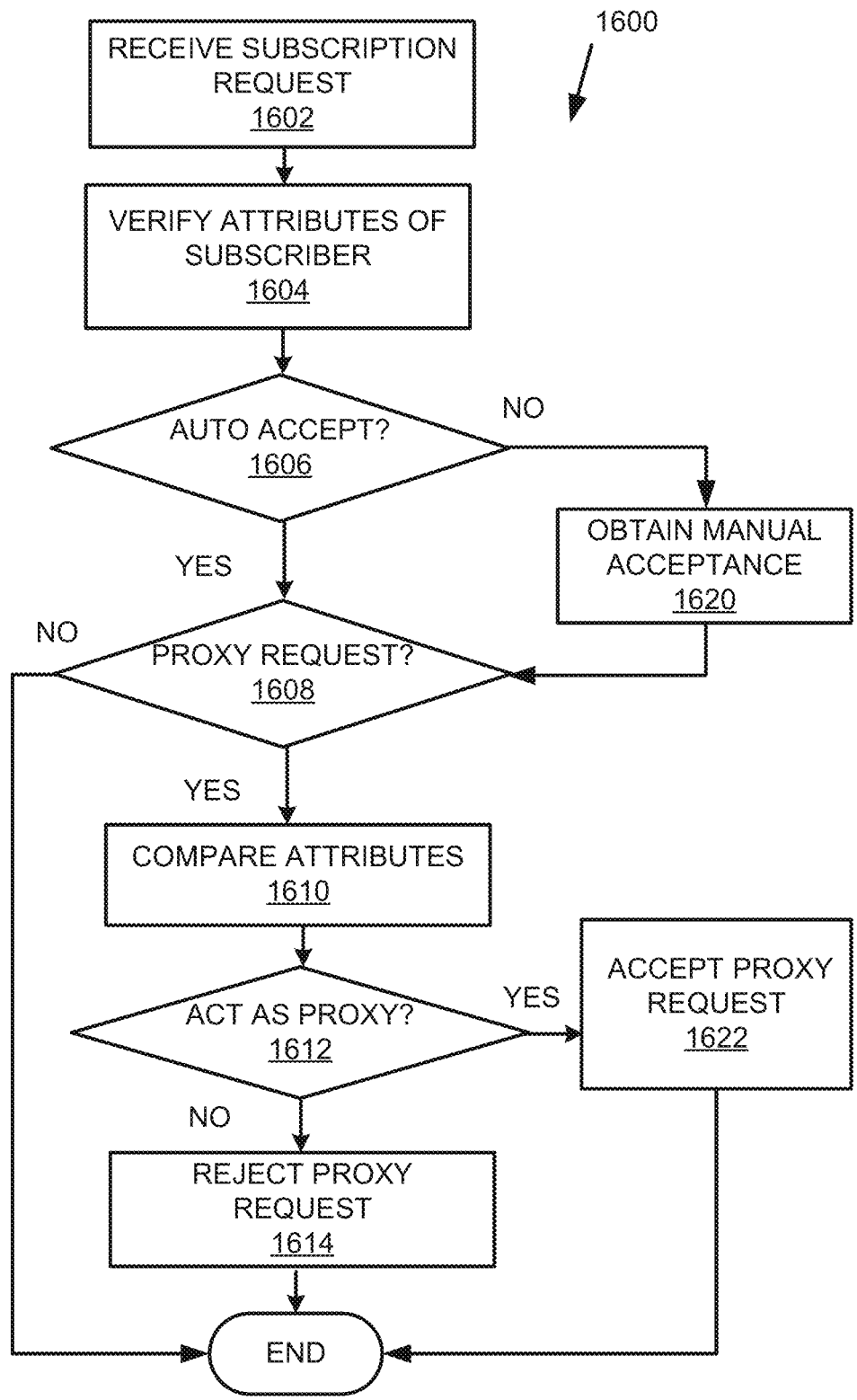
FIG. 16 is a flowchart that details a method of subscription acceptance by an agent member.

FIG. 16 is a flowchart 1600 that details a method of subscription acceptance by an agent member as implemented by the master agent 150 within the network 1200 in accordance with an example. The method begins at 1602 wherein a subscription alert is received for an agent member at the master agent 150 by another member of the network 1200. The subscription may be received either from another agent member or a human member. In either case, the attributes of the subscriber such as but not limited to, the identity of the subscriber, the origin data such as geographic location and/or network address of the subscription alert, the rating of the subscriber, the date at which the subscriber began membership of the network 1200 and the like are verified at 1604. Based on the results of the verification of the attributes, a determination is made at 1606 whether the subscription request is to be automatically accepted or not. In addition to the subscriber attributes, the attributes or preferences of the member receiving the subscription alert may also be considered when making the decision at 1606. If it is determined that the subscription is not to be automatically accepted, the method proceeds to 1620 wherein manual acceptance of the subscription request is obtained and the method proceeds to 1608.

If at 1606, it is determined that the request for subscription can be automatically accepted, at 1608, it is further determined if a proxy request is received, for example, corresponding to the subscription alert. As mentioned herein, an agent that is functionally similar to another agent or which can execute the functions of another agent may act as proxy for the other agent when the other agent is malfunctioning or otherwise inactive. Accordingly at 1610, the attributes are compared and if it is determined at 1612 that the agent receiving the proxy request can act as a proxy to the requesting agent, the proxy request is accepted at 1622 and the method terminates on the end block. If it is determined at 1612 that the agent receiving the proxy request cannot act as a proxy to the requesting agent, the proxy request is rejected at 1614 and the method terminates on the end block.

Figure 17:
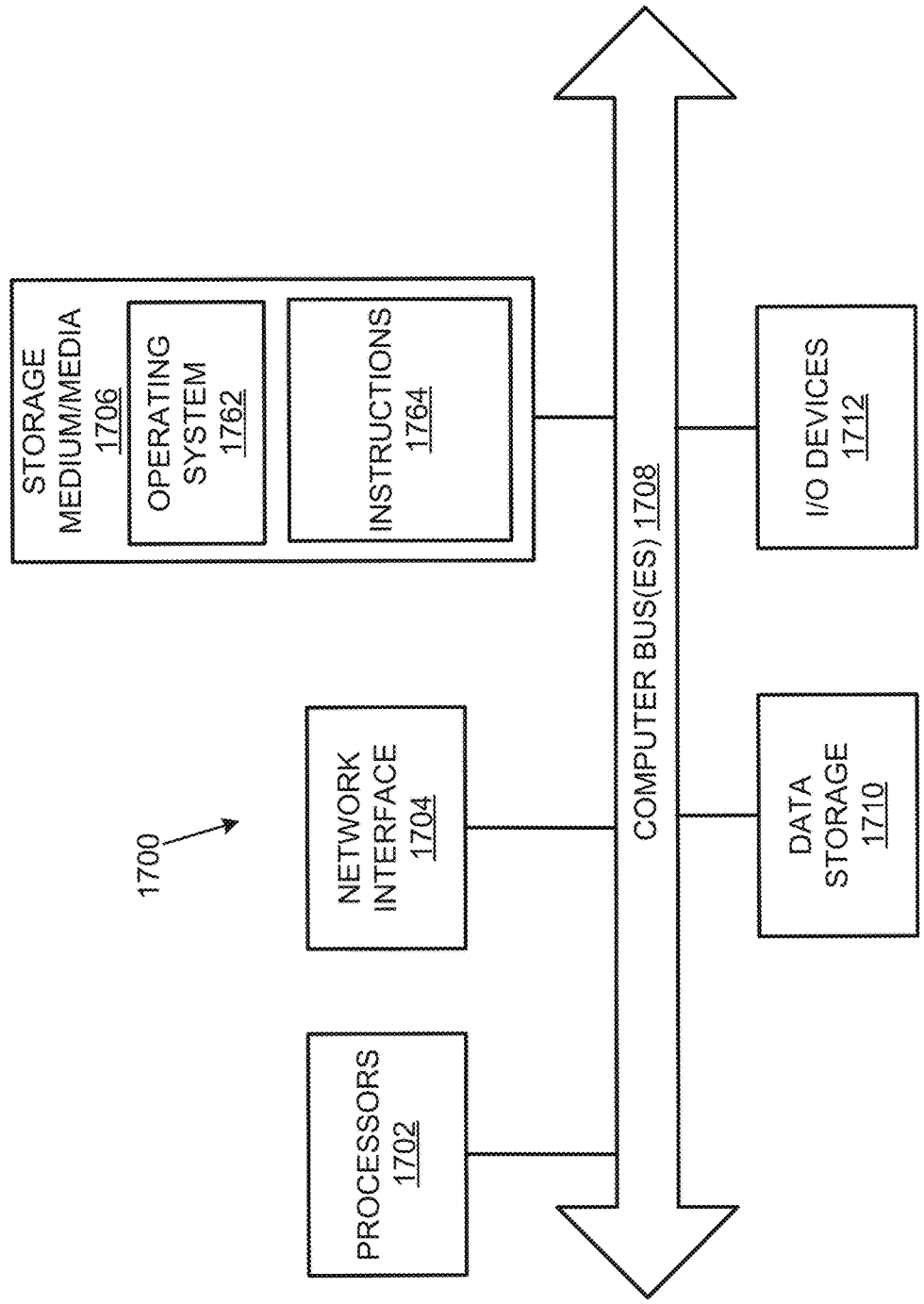
FIG. 17 illustrates a computer system that may be used to implement one or more of the TM system or the master agent in accordance with one example.

FIG. 17 illustrates a computer system 1700 that may be used to implement one or more of the TM system 100 and the master agent 150. The computer system 1700 may include additional components not shown and that some of the components described may be removed and/or modified.

The computer system 1700 includes processor(s) 1702, such as a central processing unit, ASIC or other type of processing circuit, input/output devices 1712, such as a display, mouse keyboard, etc., a network interface 1704, such as a Local Area Network (LAN), a wireless 802.16x LAN, a 3G or 4G mobile WAN or a WiMax WAN, and a computer-readable medium 1706. Each of these components may be operatively coupled to a bus 1708. The computer-readable medium 1706 may be any suitable medium which participates in providing instructions to the processor(s) 1702 for execution. For example, the computer-readable medium 1706 may be non-transitory or non-volatile medium, such as a magnetic disk or solid-state non-volatile memory or volatile medium such as RAM. The instructions or modules stored on the computer-readable medium 1706 may include machine readable instructions 1764 executed by the processor(s) 1702 to perform the methods and functions for one or more of the TM system 100 master agent 150. The computer-readable medium 1706 may also store an operating system 1762, such as MAC OS, MS WINDOWS, UNIX, or LINUX. The operating system 1762 may be multi-user, multiprocessing, multitasking, multithreading, real-time and the like. For example, during runtime, the operating system 1762 is running and the instructions 1764 are executed by the processor(s) 1702.

The computer system 1700 may include a data storage 1710, which may include non-volatile data storage. The data storage 1710 stores any data used by one or more of the TM system 100 master agent 150. The data storage 1710 may be used to store real-time data or processed historical data which may be used by one or more of the TM system 100 or the master agent 150.

The network interface 1704 connects the computer system 1700 to internal systems for example, via a LAN. Also, the network interface 1704 may connect the computer system 1700 to the Internet. For example, the computer system 1700 may connect to web browsers and other external applications and systems via the network interface 1704.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A telemetry master (TM) system for automatic monitoring and maintenance comprising:
   at least one processor; and
   a non-transitory data storage storing machine readable instructions that cause the at least one processor to:
   receive an alert at a data buffer of the TM system from an application of a plurality of applications, the plurality of applications are communicatively coupled to a plurality of backend systems;
   obtain attributes of the alert via natural language processing (NLP);
   retrieve context information to be used with the attributes via the NLP;
   predict, using a pre-trained, machine learning (ML)-based first data model, an action to be executed in response to the alert, the action being identified based on the attributes of the alert and the context information;
   select, using a second ML-based data model, at least one of the plurality of applications for executing the action;
   automatically trigger the action in one or more of the plurality of backend systems using the selected application;
   receive, via at least one of the plurality of applications, results from triggering the action in the one or more backend systems;
   determine if further action is required based on the results from triggering the action; and
   initiate the further action if it is determined that further action is required, else
   transmit a closing message if it is determined that no further action is required.

2. The telemetry master system of claim 1, the non-transitory data storage storing machine readable instructions that cause the at least one processor to:
   receive data entries related to functioning of the plurality of backend systems from the plurality of applications subsequent to execution of one or more of the action and the further action.

3. The telemetry master system of claim 2, the non-transitory data storage storing machine readable instructions that cause the at least one processor to:
   determine, via a similarity function, prior data entries in the data buffer that are similar to the received data entries.

4. The telemetry master system of claim 3, the non-transitory data storage storing machine readable instructions that cause the at least one processor to:
   delete the prior data entries in the data buffer that are similar to the received data entries; and
   store the received data entries in the data buffer.

5. The telemetry master system of claim 2, the non-transitory data storage storing machine readable instructions that cause the at least one processor to:
   determine if the received data entries stored in the data buffer meet a data threshold; and
   train the first data model on the received data entries upon the received data entries meeting the data threshold.

6. The telemetry master system of claim 1, wherein the machine readable instructions for predicting the action to be executed causes the at least one processor to:
   collect historical data regarding anomalies arising in the plurality of backend systems and solutions implemented for the anomalies; and
   train the first data model on the historical data.

7. The telemetry master system of claim 6, wherein the first data model is a deep learning neural network.

8. The telemetry master system of claim 7, wherein a softmax function is used for determining the action from a plurality of possible actions.

9. The telemetry master system of claim 1, wherein the machine readable instructions for retrieving the context information causes the at least one processor to:
   initially storing the context information in a context buffer that is powered by regular expressions.

10. The telemetry master system of claim 1, wherein the second data model is a Long Short-Term Memory (LSTM).

11. A method for automatic monitoring and maintenance comprising:
    receiving at a central repository, data entries from at least one of a plurality of applications associated with a plurality of backend systems;

identifying prior data entries in a data buffer similar to the received data entries;
deleting the prior data entries that are similar to the received data entries;
extracting attributes and contextual information from the received data entries;
setting the attributes and the contextual information in a feature matrix;
providing the feature matrix to a pre-trained first ML data model upon receiving a threshold number of data entries;
obtaining, from processing of the feature matrix by the pre-trained first ML data model, predicted class labels corresponding to actions to be executed;
determining if probabilities associated with the feature matrix meet confidence thresholds corresponding to the actions to be executed;
if at least one of the probabilities meets a corresponding one of the confidence thresholds:
determining, via a second data model, one or more of the plurality of backend systems of the plurality of backend systems that are to execute the actions;
causing the one or more of the plurality of backend systems to execute the actions; and
if at least one of the probabilities does not meet the corresponding one of the confidence thresholds:
repeating the steps of receiving, identifying, deleting, extracting, setting, providing, obtaining and determining for the at least one probability that does not meet the corresponding one of the confidence thresholds.

12. The method of claim 11, further comprising:
processing the received data entries via natural language processing (NLP); and
storing context information associated with the data entries in a context buffer.

13. The method of claim 11, wherein determining via the second data model one or more of the plurality of backend systems further comprises:
processing, using regular expressions via a long short-term memory (LSTM), the received data for determining the one or more backend systems of the plurality of backend systems that are to execute the actions.

14. The method of claim 13, wherein determining the one or more backend systems further comprises:
extracting context information from the received data entries using the regular expressions.

15. The method of claim 11, wherein identifying prior data entries in a data buffer similar to the received data entries further comprises:
identifying the prior data entries that are similar to the received data entries using cosine similarity function.

16. The method of claim 11, further comprising:
maintaining a full duplex communication channel between the central repository and the plurality of applications.

17. The method of claim 16, wherein causing the one or more of the plurality of backend systems to execute the actions further comprises:
causing exchange of communications via the communication channel between the one or more of the plurality of applications.

18. A non-transitory computer-readable storage medium comprising machine-readable instructions that cause a processor to:
receive at a central repository, data entries from at least one of a plurality of applications associated with a plurality of backend systems;
identify prior data entries in a data buffer similar to the received data entries;
delete the prior data entries that are similar to the received data entries;
extract attributes and contextual information from the received data entries;
set the attributes and the contextual information in a feature matrix;
provide the feature matrix to a pre-trained first ML data model upon receiving a threshold number of data entries;
obtain, from processing of the feature matrix by the pre-trained first ML data model, predicted class labels corresponding to actions to be executed;
determine if probabilities associated with the feature matrix meet confidence thresholds corresponding to the actions to be executed;
if at least one of the probabilities meets a corresponding one of the confidence thresholds:
determine, via a second data model, one or more of the plurality of backend systems of the plurality of backend systems that are to execute the actions;
cause the one or more of the plurality of backend systems to execute the actions; and
if at least one of the probabilities does not meet the corresponding one of the confidence thresholds:
repeat the steps of receiving, identifying, deleting, extracting, setting, providing, obtaining and determining for the at least one probability that does not meet the corresponding one of the confidence thresholds.

19. The non-transitory computer-readable storage medium of claim 18, further comprising machine-readable instructions that cause the processor to:
determine if the received data entries stored in the data buffer meet a data threshold; and
train the pre-trained first data model on the received data entries upon the received data entries meeting the data threshold.

20. The non-transitory computer-readable storage medium of claim 18 wherein the plurality of applications include applications related to a power plant and the machine readable instructions for determining the action to be executed comprise further instructions that cause the processor to:
determine that a power deficit exists due to a damaged asset; and
enable automatic purchase of additional power to cover the power deficit.

* * * * *